United States Patent
Hagerty et al.

(10) Patent No.: US 8,088,870 B2
(45) Date of Patent: Jan. 3, 2012

(54) METHODS FOR APPLYING SOLUTION CATALYSTS TO REACTOR SURFACES

(75) Inventors: Robert O. Hagerty, La Porte, TX (US); Kevin B. Stavens, Houston, TX (US); Randall B. Laird, Pasadena, TX (US); Zerong Lin, Kingwood, TX (US); Michael E. Muhle, Kingwood, TX (US); Agapios K. Agapiou, Humble, TX (US); David M. Glowczwski, Baytown, TX (US); Fathi D. Hussein, Cross Lanes, WV (US); Gary D. Mohr, Houston, TX (US); Ted A. Powell, La Porte, TX (US); Michael E. Sieloff, Houston, TX (US); Edward F. Smith, Kingwood, TX (US); Keith W. Trapp, Baton Rouge, LA (US)

(73) Assignee: Univation Technologies, LLC, Houston, TX (US)

( * ) Notice: Subject to any disclaimer, the term of this patent is extended or adjusted under 35 U.S.C. 154(b) by 155 days.

(21) Appl. No.: 12/529,580

(22) PCT Filed: Feb. 21, 2008

(86) PCT No.: PCT/US2008/002317
§ 371 (c)(1),
(2), (4) Date: Mar. 4, 2010

(87) PCT Pub. No.: WO2008/108931
PCT Pub. Date: Sep. 12, 2008

(65) Prior Publication Data
US 2010/0184927 A1    Jul. 22, 2010

Related U.S. Application Data

(60) Provisional application No. 60/905,274, filed on Mar. 6, 2007, provisional application No. 61/002,159, filed on Nov. 7, 2007.

(51) Int. Cl.
*C08F 2/00* (2006.01)
*C08F 4/00* (2006.01)
*C08F 4/24* (2006.01)
*C08F 4/06* (2006.01)
*C08F 110/02* (2006.01)
*B01J 8/18* (2006.01)

(52) U.S. Cl. ............ 526/62; 526/352; 526/90; 526/104; 526/101; 526/154; 422/139

(58) Field of Classification Search .................... 526/62, 526/90, 101, 104, 154, 352; 422/139
See application file for complete search history.

(56) References Cited

U.S. PATENT DOCUMENTS
3,449,062 A    6/1969    Reh et al. ............... 423/351
(Continued)

FOREIGN PATENT DOCUMENTS
WO    WO 97/49771    12/1997
WO    WO 2004/029098    4/2004

Primary Examiner — William Cheung

(57) ABSTRACT

A method for treating at least one interior surface (for example, a bed wall) of a fluidized bed polymerization reactor system, including by applying a solution catalyst (preferably at least substantially uniformly and in liquid form) to each surface, and optionally (where a catalyst component of the solution catalyst comprises at least one chromium containing compound) oxidizing at least some of the applied chromium containing compound in a controlled manner.

32 Claims, 4 Drawing Sheets

U.S. PATENT DOCUMENTS

| | | | |
|---|---|---|---|
| 3,539,293 A | 11/1970 | Boucraut et al. | 423/633 |
| 4,460,330 A | 7/1984 | Asai et al. | 431/170 |
| 4,532,311 A * | 7/1985 | Fulks et al. | 526/62 |
| 4,792,592 A | 12/1988 | Fulks et al. | 526/62 |
| 4,803,251 A | 2/1989 | Goode et al. | 526/59 |
| 4,876,320 A | 10/1989 | Fulks et al. | 526/62 |
| 5,391,657 A | 2/1995 | Song et al. | 526/74 |
| 6,335,402 B1 * | 1/2002 | Mihan et al. | 526/62 |
| 2002/0026018 A1 | 2/2002 | Agapiou et al. | 526/127 |
| 2004/0063874 A1 * | 4/2004 | Muhle et al. | 526/114 |

* cited by examiner

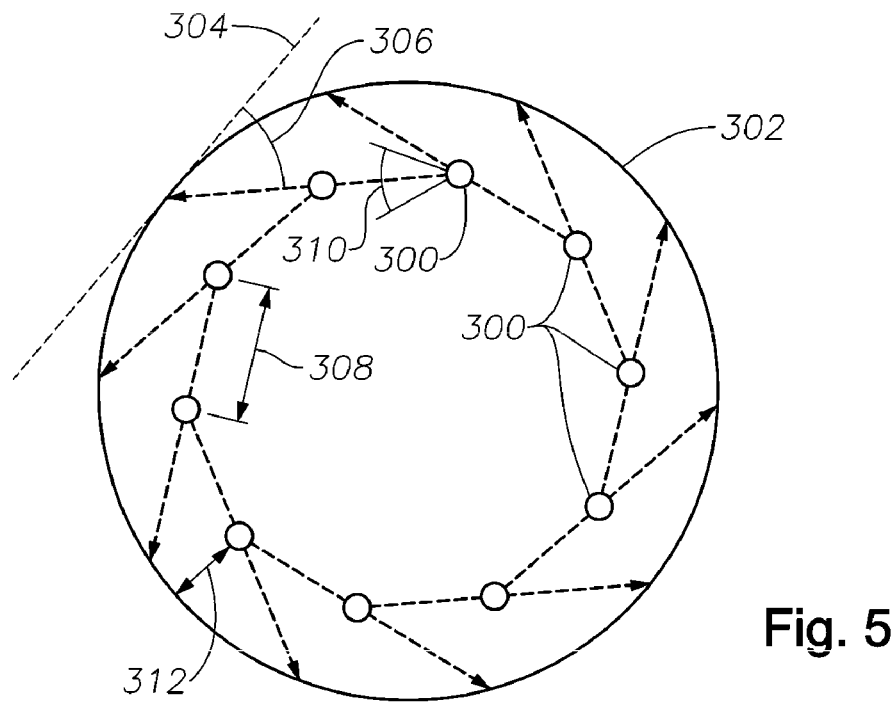
Fig. 5
Fig. 6 Solution Versus Vapor Deposition
Comparison of Polymer Amounts
Produced By the Two Methods
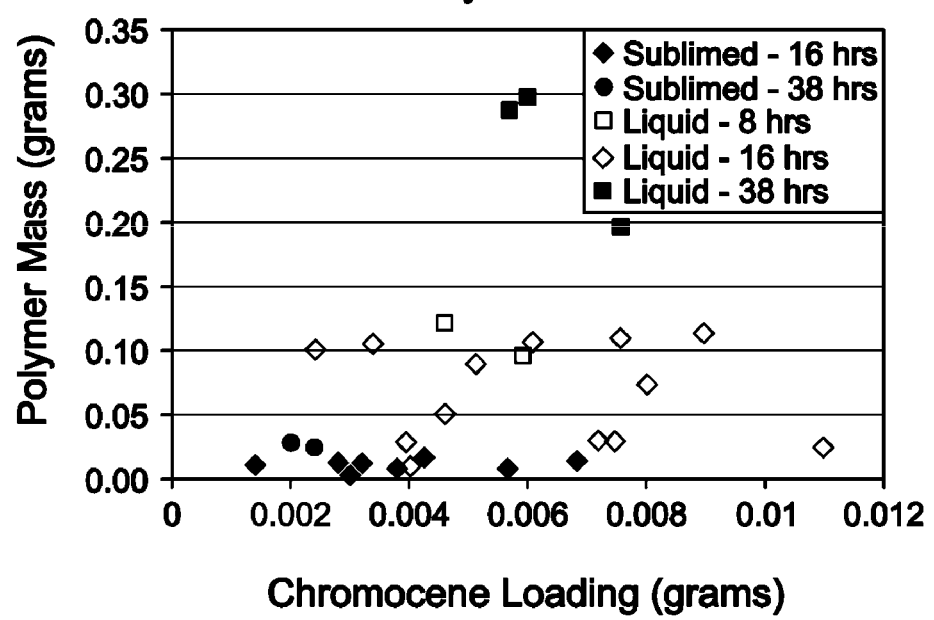

METHODS FOR APPLYING SOLUTION CATALYSTS TO REACTOR SURFACES

CROSS REFERENCE TO RELATED APPLICATIONS

This application is a National Stage application under 36 U.S.C. §371 of International Application No. PCT/US2007/002317, filed Feb. 21, 2008, that claims the benefit of Ser. No. 60/905,274, filed Mar. 6, 2007, and Ser. No. 61/002,159, filed Nov. 7, 2007, the disclosures of which are incorporated by reference in their entireties.

FIELD OF THE INVENTION

The invention generally relates to methods and apparatuses for treating surfaces (e.g., bed walls) of gas phase polymerization reactors by applying solution catalysts thereto to prepare the surfaces for subsequent formation of a polymer coating thereon. In typical embodiments, the reactors are gas phase polymerization reactors for use in polymerizing at least one olefin in the presence of at least one catalyst or catalyst system.

BACKGROUND

The expression "interior surface" of a fluidized bed polymerization reactor system (or reactor) herein denotes a surface of the reactor system (or reactor) that is exposed to a reactant, recycle gas, and/or polymerization product during performance of a polymerization reaction in the reactor system (or reactor).

The expression "bed wall" is used herein to denote the portion or portions of the interior surfaces of a fluidized bed gas phase polymerization reactor system (or reactor) that is or are in contact with the fluidized bed during normal polymerization operation of the reactor system (or reactor). For example, typical embodiments of the invention pertain to treating the bed wall of a fluidized bed polymerization reactor preliminary to forming a polymer coating on the treated bed wall. The treatment applies a catalyst (in solution) to the bed wall so that the polymer coating can be formed by a special polymerization reaction in the presence of the applied catalyst. The special polymerization reaction is not the normal polymerization reaction to be performed in the reactor after the polymer coating has been formed.

The expression "solution catalyst" is used herein to denote a solution of at least one catalyst in at least one solvent. For example, chromocene (or another polymerization catalyst) dissolved in an aromatic solvent, such as, toluene (or another solvent) is a solution catalyst.

The term "comprises" is used herein to denote "is or includes."

Gas phase polymerization of monomers, for example, olefin monomers, may be prone to forming "sheets" on the walls of the reactor vessel, particularly on certain catalyst types. Sheeting refers to the adherence of fused resin and resin particles to the walls or the dome of a reactor. The sheets vary widely in size. Sheets may be ¼ to ½ inch thick and may be from a few inches to several feet long. They may have a width of 3 inches to more than 18 inches. The sheets may have a core composed of fused polymer, which is oriented in the long direction of the sheets, and their surfaces are covered with granular resin that has fused to the core. The edges of the sheets often have a hairy appearance from strands of fused polymer. Sheeting rapidly plugs product discharge systems and/or disrupts fluidization, leading to the need for costly and time-consuming shutdowns.

Gas phase processes have been found to be particularly prone to sheeting when producing polymers using Ziegler-Natta catalysts, particularly Type III and Type IV Ziegler-Natta catalysts, certain bimodal catalyst systems, and catalyst systems containing metallocene catalyst compounds. While metallocene catalysts yield polymers with unique characteristics, they also present new challenges relative to traditional polymerization systems, in particular, the control of reactor sheeting.

A correlation exists between reactor sheeting and the presence of excess static charges, either positive or negative, in the reactor during polymerization (see, for example, U.S. Pat. Nos. 4,803,251 and 5,391,657). This is evidenced by sudden changes in static levels followed closely by deviation in temperature at the reactor wall. When the static charge levels on the catalyst and resin particles exceed critical levels, electrostatic forces drive the particles to the grounded metal walls of the reactor. The residency of these particles on the reactor wall facilitates melting due to elevated temperatures and particle fusion. Following this, disruption in fluidization patterns is generally evident, such as, for example, catalyst feed interruption, plugging of the product discharge system, and the occurrence of fused agglomerates (sheets) in the product.

It has been found that the presence of polymer coating on the bed wall of a gas phase (fluidized bed) polymerization reactor is desirable for reducing the tendency of the reactor to form sheets. Without being bound by theory, it is believed that the presence of certain reactor wall coatings (e.g., polymer coatings) inhibits the triboelectric charge transfer that would otherwise occur as the resin in the fluidized bed rubs against the metal reactor walls. Without being bound by theory, it is further believed that inhibiting the triboelectric of charge transfer has the effect of minimizing (or reducing) the accumulation of electrostatic charge on the resin. It is well known the accumulation of electrostatic charge on the resin can contribute to the formation of sheets in the reactor.

Fluidized bed polymerization reactors are often constructed of carbon steel, typically rated for operation at pressures up to about 30 bars (about 3.1 megapascals), and have interior surfaces composed of carbon steel. The normal appearance of the interior surfaces is that of plain, uncoated metal. However, a thin coating of polymer always (or almost always) forms on the bed wall of a fluidized bed polymerization reactor that has been in service. The coating is usually thin and relatively clear so that its presence is difficult to detect visually, but its presence can be detected with an Eddy current-type meter. The coating is normally composed of relatively low Mw (molecular weight) polymer and has a thickness of 1 to 20 mils (25 to 500 microns). Even though it is very thin, the coating has a significant effect on the operability of the reactor through its effect on the static charging characteristics of the fluid bed.

It is generally recognized that during fluid bed polymerization, fluid beds of polymer and other materials become charged by frictional contact with the reactor wall through a process known as the triboelectric effect. The charging mechanism depends on two factors: the nature of the materials involved, and the degree of contact. The basic driving force for transfer of charge is the difference in electrical characteristics of the two materials that contact each other. If there were no difference between the materials involved (e.g., if the two materials contacting each other were identical, for example, if both were carbon steel) no (or minimal) charge transfer would take place. In general, larger amounts of charge are transferred when the two materials in frictional contact are more different in their electrical characteristics (i.e., when they are far apart on the triboelectric series).

In gas phase polymerization reactors, the fluid bed can become highly charged through the frictional contact of two dissimilar materials, typically frictional contact between the polymer resin in the bed and the carbon steel of the bed wall. It is known that a good quality polymer coating on the bed wall acts to reduce the charging substantially, and thereby reduces the tendency for sheets to form on the bed wall. Some believe that the polymer coating is more similar in nature to the polymer in the fluid bed (compared to the carbon steel), thus reducing the driving force for charge transfer in the triboelectric process. Whatever the reason, it is clear that the coating on the bed wall (and possibly also other interior surfaces of the reactor system) has a significant effect on the static charging characteristics of the fluid bed.

When the polymer coating on the bed wall is in "good" condition, as indicated by its charge decay characteristics, a fluidized bed reactor system can be operated for extended periods of time (months or years) without excessive static and without operational problems due to sheeting. A reactor in this state is said to have a good static baseline, is relatively insensitive to the type of product being produced (e.g., its molecular weight "Mw" and density), and can typically be operated to produce the full range of polyethylene (PE) resin grades without generating excessive levels of static charge or sheeting.

However, when the bed wall coating is in "poor" condition, a considerable amount of static activity can develop in the fluid bed, which often leads to sheeting. A reactor in this state is said to be "sensitive" because the static charging characteristics become highly sensitive to the Mw and density of the product being produced.

The factors that cause the polymer coating on a bed wall to change from good to bad have been investigated from several different aspects. For example, it is known that the coating can deteriorate during normal polymerization operation and maintenance by exposure to aluminum alkyls compounds followed by repeated or prolonged exposure to water and air when the reactor is opened for maintenance. Aluminum alkyl compounds that are known to cause deterioration include methyl and ethyl alumoxane, triethyl aluminum and trimethyl aluminum. The alumoxanes are commonly used in metallocene polymerization and include bound trimethyl aluminum. Trimethyl and triethyl aluminum are commonly employed as cocatalyst in Ziegler-Natta polymerization. Water reactions with organoaluminum are the origin of the deterioration. It has been experimentally confirmed that μ-oxo compounds are formed which quickly deactivate to form a particular hydrated species of alumina called boehmite and represented chemically by Al(O)OH.

It is also suspected that prolonged exposure to impurities can lead to wall film degradation. These impurities include $C_6$ oxides such as hexanol, and 1,2 hexanediol, both of which are reaction products of 1-hexene and oxygen. Thus, it is hypothesized that the deterioration in bed wall coatings may involve an oxidation of the polymer coating.

Although, in most cases, it is not certain what is the exact mechanism or mechanisms that cause the deterioration, it is well known a polymer coating on the bed wall can be deteriorated or contaminated over time, and this can have a major effect on operability of the reactor.

In practice, the reactor static baseline does not change suddenly. Rather, coating contamination or deterioration usually occurs over a period of time. As this happens, static activity and sheeting problems gradually develop and appear first during the production of certain resin products. These products, usually characterized as having higher molecular weights and higher densities, are referred to as the sensitive reactor grades. With a relatively mild degree of reactor wall contamination, static and sheeting problems are initially seen with the highest Mw products and some of the higher density grades. As the static baseline deteriorates further (e.g., as the wall coating becomes more contaminated) static and sheeting problems begin to occur with more and more products. The sensitivity of sheeting risk to different resin grades appears only with a contaminated or deteriorated bed wall coating. If the coating is in good condition, static remains near zero for all products.

Two types of reactor system retreatments, for removal of a bad (deteriorated or contaminated) bed wall coating and replacement with a new polymer coating, have been used commercially. Both retreatment methods involve preparation of the bed wall (typically by removal of an existing bad polymer coating) and the in situ creation of a new polymer coating on the wall. These conventional techniques have proven effective to some degree and with some catalyst systems.

One type of conventional retreatment method is known as chromocene treatment. To perform such retreatment, the bad (e.g., contaminated) polymer coating is removed from the bed wall by grit blasting. The reactor is then sealed and purged with nitrogen to remove oxygen and moisture. A solution catalyst (chromocene in solution) is then introduced into the reactor and the catalyst deposits on the reactor wall. The catalyst on reactor wall is then activated by controlled oxidation, purging, and then introducing ethylene and an alkyl such as tri-ethyl aluminum to form a new polymer resin coating (preferably a high molecular weight polymer coating) on the bed wall that may be effective in reducing charge buildup on the reactor bed wall and impeding sheet formation. The solution catalyst may include any of various chromium compounds (e.g., bis-cyclopentadienyl chromium and other chromocenes). U.S. Pat. Nos. 4,532,311, 4,792,592, and 4,876,320, for example, disclose methods of reducing sheeting in a fluidized bed reactor by introducing a chromium-containing compound into the reactor prior to a special polymerization reaction (catalyzed by the chromium) to form the high molecular weight coating on the bed wall of the reactor.

Another type of conventional reactor retreatment (for restoring a previously formed polymer coating) is known as hydroblasting. In this method, a contaminated or damaged polymer coating is removed from the bed wall with a high-pressure water jet. The reactor is then dried and purged with nitrogen and restarted in the normal fashion, but with a relatively high concentration of hydrogen so as to produce (by polymerization) a high melt index material (the melt index or "MI" is typically 10 or more as measured by the I2 method). The high melt index, low Mw resin produced readily deposits on the reactor bed wall, producing a new polymer coating which reduces the risk of sheeting during subsequent normal polymerization operation of the reactor.

We next describe typical conventional chromocene retreatment methods in more detail. After the bed wall is cleaned (e.g., by grit blasting) and the reactor is sealed and purged, such methods include the step of injecting a chromium-containing compound in solution (e.g., chromocene dissolved in toluene) into the reactor and circulating the injected compound so that some of the catalyst is deposited on the reactor's bed wall. The deposited catalyst is then oxidized, and the reactor is then opened for cleaning. The next step in this retreatment method is to purge the reactor with nitrogen and then activate the deposited catalyst by introducing ethylene and an alkyl to the reactor. The chromium-containing compound (e.g., chromocene) acts as a catalyst to polymerize the ethylene in the presence of alkyl to form the coating.

In conventional chromocene treatment methods, it is desired that the chromocene-containing solution (e.g., chromocene dissolved in toluene) will contact the reactor's bed wall to deposit the chromocene on the bed wall. It is generally believed that the concentration of chromocene in the solvent is not critical to the process, and this concentration is typically selected to assure that the chromocene is completely dissolved in the solvent. A solution containing about 5 to 8 percent by weight of chromocene in toluene is commonly used.

Referring to FIG. 1, conventional deposition of chromocene on the interior surfaces of a gas phase polymerization reactor 4 is typically done by injecting a chromocene containing solution through a feed tube at each one of a set of catalyst injection points 2. One such feed tube is shown at point 2 in FIG. 1. At each injection point, the solution may be injected through a single straight tube or through a tube with a spray nozzle at its end. An inert gas, such as nitrogen, is circulated through reactor 4 by cycle compressor 6 while the solution is slowly injected over a period of time (typically at least one to three hours, and sometimes as long as eight hours). The reactor system then circulates the mixture for a relatively long time (e.g., about twenty hours). It has been found that the level of chromium deposited on the bed wall by such a conventional method is typically significantly lower than the level of chromium deposited in the bottom head and on the bottom of the reactor's distributor plate 10. The method preferentially deposits the chromium on distributor plate 10 and in various parts of the reactor system other than the bed wall, such as in cycle compressor 6 and cycle cooler 12. The chromium deposited on distributor plate 10 (and other parts of the reactor system other than the bed wall) by the prior art method typically must be cleaned off before reacting the chromium to form the desired polymer coating.

The polymer coating formed on the bed wall of a fluidized bed polymerization reactor after chromocene treatment is intended to function as an insulating layer that reduces static charging in the reactor system, thereby reducing the potential for sheeting during subsequent normal polymerization reactions. Although typically thin (e.g., about 1 to about 20 mils, or 0.025 to 0.50 millimeters, where one "mil" denotes 0.001 inches), such a polymer coating can be effective in reducing static charging and is typically also durable. Often, a typically thin polymer coating of this type has a service life of at least four years before another retreatment is required, if (as is typical) the coating consists of a high density, high molecular weight (very low melt index) polymer. Such a coating having high density, high molecular weight, and low melt index, is typically highly resistant to abrasion by the softer polymer typically present in the fluid bed during normal polymerization operation.

The polymer coating formed on the bed wall of a fluidized bed polymerization reactor by conventional chromocene retreatment typically does not have uniform thickness throughout the bed wall. Without being bound by theory, the inventors believe that the conventional methods do not provide a uniform polymer coating on the bed wall because the chromium containing compound is not deposited uniformly on the bed wall.

Although conventional chromocene retreatment methods can form effective and reliable polymer coatings on the bed walls of fluidized bed polymerization reactors, they do not reliably form such effective and reliable coatings. Often, such conventional methods fail to form effective and reliable polymer coatings and instead form little or no polymer on a bed wall (or on portions of a bed wall). Without an effective polymer coating, a reactor that has undergone such failed treatment is sensitive to static charging and sheeting, particularly during polymerization reactions using metallocene catalysts.

The inventors have recognized that conventional application of chromocene solution (or other solution catalyst) during conventional retreatment methods allows the solution catalyst to evaporate (or undergo sublimation) before contacting the bed wall, so that the catalyst is not applied to the bed wall in the form of liquid droplets. This prevents the conventional methods from reliably forming effective, reliable polymer coatings on the bed wall.

What is needed is a more reliable method for forming effective and reliable polymer coatings on the bed walls and other interior surfaces of fluidized bed polymerization reactors.

Fouling problems often result from the performance of methods that include steps of applying solution catalyst to interior surfaces of a polymerization reactor system and then performing a polymerization reaction (catalyzed by the applied catalyst) to form a polymer coating on each surface. Specifically, excessive amounts of the polymer coating material can foul components of the system. Some reactor system components (e.g., distributor plates and compressor bases) are particularly vulnerable to this type of fouling. It would be desirable if such methods could be modified to reduce or eliminate such fouling of reactor system components with polymer coating material.

SUMMARY

In a class of embodiments, the invention is a method for treating at least one interior surface (e.g., a bed wall) of a fluidized bed polymerization reactor system, including a step of applying a solution catalyst at least substantially uniformly and in liquid form (e.g., in the form of liquid droplets of the solution catalyst) to each said surface. Typically, the applied solution catalyst is dried (or allowed to dry) to leave a dry coating of catalyst on each surface and a polymerization reaction (catalyzed by the catalyst) is then performed to form on each surface a polymer coating that reliably functions as an insulating layer that reduces static charging in the reactor system (and thereby reduces the potential for sheeting) during subsequent polymerization reactions in the reactor system. The best drying temperature and other best parameters for drying the solvent component of the solution catalyst (e.g., toluene) after applying the solution catalyst in liquid form in accordance with the invention will depend on the particular situation. Any of a broad range of drying parameters (e.g., drying temperature) may be best depending on the particular situation.

In some embodiments, the interior surface to be treated is the bed wall of the reactor system. Typically, the reactor includes a distributor plate and a recycle line, and the at least one interior surface to be treated is or includes at least one of the distributor plate, the recycle line, and the bed wall of the reactor system. In preferred embodiments, liquid droplets of the solution catalyst are applied to each interior surface (on which the polymer coating is to be formed) to coat each such surface at least substantially uniformly with liquid solution catalyst before the applied solution catalyst evaporates or undergoes sublimation.

In a class of embodiments, the catalyst component of the solution catalyst is or includes a chromium containing compound ("CCC"). In some such embodiments, the CCC is chromocene. In some embodiments (including some in which the solution catalyst includes chromocene), the solvent component of the solution catalyst is toluene. In other embodiments, the solvent component is benzene, isopentane, hexane, or another solvent suitable for the particular application (including the particular catalyst to be applied and method of dispersion to be employed). A polar solvent (e.g., water) is unacceptable for use as the solvent when the catalyst is chromocene. In a class of preferred embodiments in which the catalyst component is a CCC, the polymer coating formed (by a polymerization reaction catalyzed by the catalyst) is polyethylene. In general, the solvent should be inert and the solution catalyst should be introduced into an inert gaseous environment in the reactor system so that the catalyst does not react until after it has been applied to each relevant surface and the desired polymer coating-forming polymerization has commenced. Typically, the solvent functions merely to carry the catalyst and to aid in the catalyst's dispersal within the reactor and application (in liquid form) to the bed wall.

Application of solution catalyst in liquid form to an interior surface of a reactor system in accordance with the invention can result in formation of a thicker coating of polymer on the surface (during a subsequent polymerization reaction catalyzed by the applied catalyst) than if the solution catalyst were allowed to evaporate or sublimate before application. Increased thickness of the polymer coating is expected to make the coating more effective in minimizing static charging of the system during polymerization operation after formation of the coating ("normal" polymerization operation). More importantly, application of the catalyst in liquid form in accordance with preferred embodiments of the invention increases the applied catalyst's reactivity during the subsequent process of forming a polymer coating on each surface to be coated, thus reducing the risk that a polymer coating of insufficient thickness will be formed on at least some areas of each surface to be coated. Application of solution catalyst in liquid form to reactor surfaces in accordance with preferred embodiments of the invention is expected to allow more reliable formation of effective and reliable polymer coatings on the surfaces and to reduce the likelihood of failed attempts to form effective and reliable polymer coatings.

It is suspected that chromocene catalyst applied in liquid form to a reactor surface in accordance with the invention has smaller crystal structure than if the catalyst was applied conventionally (as a vapor). This smaller crystal may be one of several factors contributing to the observed result that catalyst applied in accordance with the invention is more effective in catalyzing subsequent polymer coating-forming polymerization reactions than if applied conventionally.

Two classes of embodiments of the inventive method are improved versions of conventional solution catalyst application methods. Each includes the step of applying solution catalyst in liquid form to the bed wall of a polymerization reactor system (and optionally also at least one other interior surface of the reactor system, e.g., a distributor plate and/or recycle line). In both classes, the applied solution catalyst may be a solution of chromocene in an aromatic solvent, such as, toluene (e.g., a 5 to 8 wt. solution of chromocene in toluene). In the conventional methods, the introduced solution catalyst vaporizes prior to contact with most sections of the bed wall. Thus, the conventional methods apply the catalyst to the bed wall by vapor deposition in contrast to liquid deposition in accordance with the noted embodiments of the invention.

In one of the noted classes of embodiments, the solution catalyst (e.g., chromocene solution) is injected through an inlet in the side of a reactor that includes inert gas and is preferably empty of polymer. In some preferred embodiments in this class, the reactor contains only nitrogen and the solution catalyst is injected through a feed tube that extends through the side of the reactor (e.g., tube 2 of FIG. 1). In other preferred embodiments, liquid solution catalyst is introduced into the reactor system by being injected into the reactor's gas recycle line (e.g., tubing 5 of FIG. 3). Due to the small cross-sectional area of the recycle line (relative to the cross-sectional area of the reactor vessel), injection of the solution catalyst directly into the recycle line (while the recycle gas stream flows through the recycle line) typically results in more effective distribution and more uniform coating of the solution catalyst on each surface of the reactor system to be treated (including the bed wall, and typically also the distributor plate and recycle line) than if the liquid solution catalyst were injected directly into the reactor vessel at a location away from the recycle line's outlet (from which the recycle gas stream flows into the reactor vessel). In conventional methods in which solution catalyst is injected directly into a reactor vessel through a feed tube in the side of the vessel, the solution catalyst runs down the side of the reactor wall and onto the distributor plate where it vaporizes (by liquid evaporation and/or sublimation) before reaching most sections of the reactor wall, and thus the catalyst contacts most sections of the bed wall as a vapor rather than a liquid. In accordance with the invention, solution catalyst is injected under conditions such that at least a substantial amount of the solution neither vaporizes nor sublimates before contacting the bed wall (and optionally also before contacting at least one other interior surface of the reactor system to be coated with a polymer coating, e.g., a distributor plate surface and/or recycle line surface), and such that liquid solution catalyst contacts the bed wall at least substantially uniformly over the entire bed wall (and optionally also at least substantially uniformly contacts each other surface to be coated with a polymer coating). Preferably, after liquid solution catalyst has contacted the bed wall sufficiently uniformly, the reactor is vented to remove at least some (e.g., most or all) of the solvent component (typically toluene) of the solution catalyst that remains (e.g., remains in liquid form) in the system. The best parameters (including reactor temperature) for removing (which may include drying) the solvent after the application of liquid solution catalyst will depend on the particular situation.

In some embodiments of the inventive method (e.g., in some embodiments in which the catalyst component of the applied solution catalyst is chromocene or another CCC), after application of solution catalyst and subsequent removal of a sufficient amount of the solvent, oxygen is introduced into the system to oxidize the catalyst that has been deposited on the bed wall and optionally on each other surface to receive a polymer coating, and excess oxygen is then purged from the system (e.g., with high purity nitrogen). Typically, purging of excess oxygen from the system (e.g., with high purity nitrogen) is necessary after an oxidation step in which applied chromocene (or another applied CCC) is oxidized in a controlled manner.

In some embodiments in which a solution catalyst whose catalyst component is chromocene (or another CCC) is applied to at least one interior surface of a reactor system, each such surface is cleaned and roughened (e.g., by grit blasting), and then undergoes oxidization (e.g., by opening the reactor system to expose each surface to ambient air during and/or after the grit blasting, for example, for a 48 hour interval following the grit blasting), and then solution catalyst is applied to each cleaned, roughened, and oxidized surface.

After application of the solution catalyst (preferably in accordance with any preferred embodiment of the invention) to each surface, a protective polymer coating is typically formed on each surface (preferably after the applied CCC undergoes a controlled oxidation step typically followed by purging of excess oxygen from the system). In general, the desired polymer coating is formed on each surface (typically the bed wall and optionally also at least one other surface) by polymerization catalyzed by the deposited catalyst (where the desired polymer coating is polyethylene and the deposited catalyst is a CCC, the polymerization is typically performed after controlled oxidization of the deposited CCC followed by purging of excess oxygen from the system). To initiate formation of the polymer coating, ethylene and a poison scavenger/cocatalyst (e.g., tri-ethylaluminum (TEAl) or another aluminum alkyl) are typically added to the system. Chromocene and other CCC catalysts are typically used to polymerize ethylene but not other monomers. An oxidation step, following solution catalyst application, is typically required where the applied catalyst is chromocene, but such an oxidation step may not be required for other CCC catalysts (e.g., silyl chromate). New single site CCC catalysts may be used to polymerize monomers other than ethylene, but it is unlikely that such single site CCC catalysts would need to undergo post-application oxidation.

In the other noted class of embodiments, solution catalyst (e.g., chromocene solution) is sprayed into a reactor that includes inert gas (e.g., nitrogen) and is at least substantially empty of polymer. In some such embodiments, the solution catalyst is sprayed by one or more atomizing nozzles that produce small droplets (typically having diameter of about 20 microns) of the solution that become entrained in gas flowing throughout the reactor system. Typically, the solution catalyst droplets become entrained in a flowing gas stream comprising substantially pure nitrogen and the same solvent in which the injected catalyst is dissolved (e.g., toluene) and are carried throughout the reactor system. The droplets eventually contact the bed wall, recycle line, and distributor plate of the reactor system, and solution catalyst is deposited at least substantially uniformly in liquid form on the bed wall (and optionally also each other surface to be coated with a polymer coating, e.g., the recycle line and distributor plate). In conventional methods in which solution catalyst is sprayed into a reactor in the form of small droplets, the solvent (e.g., toluene) evaporates quickly (typically within a few seconds) in the reactor to produce a dry powder of catalyst (e.g., chromocene crystals). This catalyst powder is believed to deposit on metal surfaces of the reactor by a two-step process of sublimation (from the solid state to a vapor) and subsequent adsorption on the metal walls. In accordance with the invention, solution catalyst is sprayed into a reactor system under conditions such that at least a substantial quantity of the solution droplets do not vaporize before contacting the bed wall (and optionally also the distributor plate and recycle line), and so that liquid droplets of the solution catalyst contact (and thus a substantial amount of solution catalyst contacts) the bed wall and optionally also the distributor plate and recycle line in liquid form. Preferably, a uniform or substantially uniform distribution of liquid droplets of solution catalyst is deposited on the bed wall (over its entire surface) and optionally also on the distributor plate and recycle line. Preferably, after the droplets of solution catalyst have contacted each relevant surface sufficiently uniformly, the reactor is vented to dry and remove most of the solvent (which may be toluene). The best parameters (e.g., drying temperature) for drying and removing the solvent after application of liquid droplets of solution catalyst in accordance with the invention will depend on the particular situation. In some embodiments, after removal of a sufficient amount of the solvent, oxygen is introduced into the system to oxidize the catalyst (e.g., chromocene) that has been deposited on the bed wall and optionally on each other surface to receive a polymer coating. After purging excess oxygen (e.g., with high purity nitrogen) from the system (if such purging is necessary), or after removal of excess solvent (e.g., if an oxidation step is not performed), the desired polymer coating is then formed on the bed wall (and optionally also each other surface) by polymerization catalyzed by the deposited catalyst. To initiate formation of the polymer coating, ethylene and a poison scavenger/cocatalyst (e.g., tri-ethylaluminum (TEAl) or another aluminum alkyl) are typically added to the system.

In some embodiments of the inventive method, chromocene solution (or other solution catalyst) is injected into a reactor (e.g., in the form of liquid droplets) in such a manner as to cause the solution catalyst in liquid form to wet the reactor's bed wall (and optionally also the distributor plate and recycle line) at least substantially uniformly. The injection occurs under conditions such that the liquid solution catalyst's drying rate is sufficiently low so as not to prevent the at least substantially uniform wetting of the bed wall (and optionally also of the distributor plate and recycle line). Typically, a sufficiently low drying rate is provided by maintaining a sufficiently low temperature in the reactor during the wetting step and/or maintaining conditions in the reactor during the wetting step that are sufficient to raise the dew point temperature of the reactor system contents (including the solution catalyst) to (or to a temperature below but sufficiently near to) the reactor temperature during the wetting step.

During application of the solution catalyst, the reactor bed wall may (and typically does) have a lower temperature than the average temperature throughout the reactor. Thus, during application of solution catalyst in liquid form to the reactor bed wall in accordance with some embodiments of the invention, it may suffice that there be reactor conditions at the bed wall that keep the liquid solution catalyst's drying rate at the bed wall sufficiently low to allow uniform (or substantially uniform) wetting of the entire bed wall, although such reactor conditions do not exist away from the bed wall (e.g., although the dew point temperature of the reactor contents is substantially below, or even far below, the average temperature throughout the reactor). In some embodiments, conditions at the bed wall (but not necessarily throughout the reactor system) are actively maintained during application of solution catalyst in liquid form to the bed wall to keep the liquid solution catalyst's drying rate at the bed wall sufficiently low to allow uniform (or substantially uniform) wetting of the entire bed wall. In other embodiments, conditions throughout the reactor system are actively maintained during application of solution catalyst in liquid form to the bed wall, and/or each other interior surface to which liquid solution catalyst is to be applied, to keep the liquid solution catalyst's drying rate at each such surface sufficiently low to allow to allow uniform (or substantially uniform) wetting of each such surface (e.g., the dew point temperature of the reactor system contents, including the solution catalyst, is maintained above (or below but sufficiently near to) the temperature at the bed wall during the wetting step). In some embodiments, conditions at the bed wall are not actively maintained during application of solution catalyst in liquid form to the bed wall, and instead the temperature at the bed wall is (and is passively relied upon to be) sufficiently low to keep the liquid solution catalyst's drying rate at the bed wall low enough to achieve uniform (or substantially uniform) wetting of the entire bed wall (in this case, the solution catalyst is applied, e.g., injected through multiple nozzles, in such a manner as to adequately wet the entire bed wall).

To provide adequate liquid wetting of the reactor bed wall (and optionally also the distributor plate and recycle line) with solution catalyst droplets, it is important to prevent rapid drying of the droplets. If significant drying were to occur in the reactor system before adequate liquid wetting, too many of the liquid droplets would become dry powder before contacting the bed wall or other relevant surface. Dry powder on the bed wall (or distributor plate or recycle line) would be less reliable and effective than liquid droplets in forming the desired polymer coating. In some embodiments in which the solution catalyst is chromocene dissolved in toluene, sufficiently slow drying of the solution catalyst droplets is accomplished by maintaining the half-life for droplet drying at a minimum of at least twice the recycle gas turnover time in the system (where "gas turnover time" is the total volume of the reactor system, including the reactor and recycle system, divided by the volumetric flow rate of gas through the recycle system).

In some embodiments, a sufficiently slow drying rate for the solution catalyst is obtained by feeding into the reactor system (with the solution catalyst) additional solvent to raise the dew point temperature of the contents of the reactor system (including the solution catalyst) to (or to a temperature below but sufficiently near to) the reactor temperature during the wetting step. The additional solvent can be the same solvent in which the catalyst is dissolved (e.g., toluene, in typical embodiments). Preferably the additional solvent is pre-charged into the reactor before injection of the solution catalyst. Alternatively, the additional solvent is provided by feeding a more dilute solution catalyst than would be fed conventionally. Preferably, enough additional solvent is fed to raise the dew point temperature to within 5 to 30° C. of the gas temperature at the coolest point in the reactor system (typically the compressor inlet) during the wetting step. A sufficiently high dew point temperature will provide the required slow drying of solution catalyst droplets while preventing condensation of liquid on sections of the reactor wall. Such condensation would otherwise produce excessive concentrations of catalyst on those sections of the reactor wall. To minimize the amount of additional solvent required to perform these embodiments, the reactor gas temperature is maintained at a relatively low (e.g., lower than conventional) value. When the solution catalyst is chromocene dissolved in toluene, the preferred gas temperature range is 10 to 40° C. at the compressor inlet.

In accordance with some embodiments of the invention, liquid wetting of a reactor bed wall (and/or distributor plate and/or recycle line or other surface of the reactor system) with solution catalyst is accomplished by forming liquid droplets of the solution catalyst in the reactor system. The droplets are then entrained through the reactor system in a relatively slow-drying environment. The inventors have recognized (in part, as a result of tests) that catalyst deposited on a bed wall (or distributor plate or recycle line) as a liquid solution is much more effective for forming effective and reliable polymer coatings on each relevant surface than catalyst deposited from the vapor phase or as a dry powder as in conventional processes.

In some embodiments, the solution catalyst is preferentially deposited on the bed wall rather than on other interior surfaces. In some embodiments, the solution catalyst is introduced into the reactor system at a plurality of locations in proximity to a lower section of the bed wall. For example, the solution catalyst may be introduced through a plurality of upward-oriented injection devices (e.g., injection devices oriented at an angle in the range from about 40 to about 50 degrees above a horizontal plane). The plurality of injection devices may alternatively be oriented in a horizontal plane around a cylindrical (or generally cylindrical) bed wall, each at an angle in the range from about 40 to about 50 degrees inward from a tangent to the bed wall. The injection devices may be positioned about 0.15 to about 1.0 meters (or about 0.40 to about 0.60 meters) above the distributor plate, optionally with the outlet of each device positioned about 0.10 to about 0.50 meters (or about 0.10 to about 0.20 meters) away from the bed wall, and optionally with each injection device oriented to emit a generally conical spray of solution catalyst having a cone angle of about 100 to about 120 degrees. In some embodiments, the solution catalyst is sprayed from one or more injection devices so as to directly deliver it to the bed wall by droplets actually contacting the bed wall. In some embodiments, multiple injection devices that point in tangential directions to the reactor wall and are placed to assure that the lower portion of the bed wall is directly impacted with sprayed solution catalyst at least substantially all the way around the circumference of the reactor (and preferably so that any overlap of spray patterns from the injection devices is minimized). In some embodiments, good first pass contact of solution catalyst on the bed wall is achieved by introducing the solution catalyst at multiple locations around the bed wall so as to create a swirling, solution catalyst-containing cloud that moves up the reactor wall as it flows with recycle gas.

Another aspect of the invention is a method for forming a polymer coating on a bed wall of a fluidized bed polymerization reactor, including the steps of:

applying solution catalyst to the bed wall in liquid form (e.g., in the form of liquid droplets) at least substantially uniformly over the bed wall, and preferably then drying the applied solution catalyst (or allowing the applied solution catalyst to dry) so that dry catalyst remains on the bed wall; and after step (a), performing a polymer-coat-forming polymerization reaction in the reactor, catalyzed by the applied catalyst, thereby forming the polymer coating on the bed wall.

Preferably, the polymer coating formed in step (b) is sufficiently thick to reduce substantially the tendency of resin sheets to form in the reactor during subsequent polymerization operations (sometimes referred to herein as normal polymerization operations) performed in the reactor after the polymer-coat-forming polymerization reaction. In some embodiments, the solution catalyst is chromocene (or other chromium containing compound) dissolved in toluene. Preferably, step (a) also includes the step of cleaning solvent from the reactor after application of the solution catalyst to the bed wall. In some embodiments, the reactor has a distributor plate and a recycle line and step (a) includes the step of applying the solution catalyst in liquid form to at least one of the distributor plate and recycle line as well as to the bed wall of the reactor, at least substantially uniformly over said at least one of the distributor plate and recycle line. Optionally, between performance of steps (a) and (b), the applied solution catalyst is oxidized and the reactor is then opened and cleaned. Typically, no fluidized bed is present in the reactor during performance of step (b). Optionally, the method also includes the step of polishing the polymer coating on the bed wall after performing step (b).

Another aspect of the invention is a method of producing a polymer product (e.g., a polyolefin product produced using a metallocene based catalyst) in a polymerization reactor system whose bed wall (and optionally also at least one other interior surface of the system, e.g., a distributor plate and/or recycle line surface) has been coated with a polymer (e.g., a high molecular weight polymer) in accordance with the invention. The polymer coating has been formed in accordance with the invention by a method including a step of applying solution catalyst in liquid form at least substantially uniformly to the bed wall and each other interior surface of the reactor system to be coated by the polymer. Typically, the polymerizing method produces a polyolefin by polymerizing a monomer and optionally also a comonomer in the presence of a catalyst or catalyst system in a fluidized bed reactor system. Some embodiments are methods for polymerizing an alpha-olefin in a fluidized bed reactor in the presence of a catalyst (or catalyst system) prone to cause sheeting during the polymerization, by maintaining the static electric charge in the reactor at least one site of possible sheet formation below static charge levels which would otherwise cause sheet formation, where the bed wall (and optionally also at least one other interior surface) of the reactor system have been pretreated by forming a polymer coating thereon including by applying solution catalyst (typically including a chromium-containing compound) at least substantially uniformly and in liquid form to the bed wall (and optionally also the at least one other interior surface).

After a fluidized bed polymerization reactor system is fabricated but before it undergoes a chromocene treatment (or another treatment preparatory to formation of a polymer coating on at least one interior surface thereof), surfaces of the system are sometimes painted with a zinc based paint to prevent formation of rust on the painted surfaces before the treatment. Such a zinc coating may be applied when the system is expected to be stored for a significant time before undergoing the treatment and then entering into service. The inventors have recognized that when a chromocene treatment is performed on a zinc-coated surface of a fluidized bed polymerization reactor system, the chromocene treatment is surprisingly less effective as a preliminary to polymer formation than if the surface were bare (not zinc-coated). The inventors have recognized that less polymer is typically formed on the zinc-coated surface than would be if the surface were bare, that polymer formed on the zinc-coated surface may be less effective to prevent generation of undesirable levels of static charge and sheeting during operation of the treated reactor to produce PE resin with metallocene based catalysts, and that the system's static charging characteristics may be more sensitive to characteristics of the product being produced than if the surface were bare at the start of chromocene treatment. Though less polymer film may be formed following chromocene retreatment of zinc-coated reactor walls, the film characteristics may be adequate for operation with less sensitive catalyst systems such Ziegler-Natta based catalysts.

In a class of embodiments, the present invention is a method for treating interior surfaces of a fluidized bed polymerization reactor system, said system including at least one element (e.g., a component or part) subject to fouling if an excessive amount of polymer coating material is formed on at least one surface of the system (an interior surface of the system to be referred to as a "sensitive" surface) during performance of the method (or during a polymerization step following performance of the method), where the system also has at least one other interior surface (to be referred to as a "nonsensitive" surface) that does not cause fouling of any element of the system if excess polymer is formed thereon. Thus, the system is less subject to fouling by polymer coating material formed on any said "nonsensitive" surface (during performance of the method or during a polymerization step following performance of the method) than by polymer coating material formed on any said "sensitive" surface in the following sense: during "post-coating" operation of the reactor system (i.e., operation after formation of the polymer coating on each sensitive and nonsensitive surface) the system can operate acceptably if a polymer coating of a first thickness (or first average thickness) has been formed on the nonsensitive surface, but the system cannot operate acceptably with a polymer coating of the first thickness (or the first average thickness) has been formed on at least one said sensitive surface. In other words, the system is subject to fouling (of a type that prevents acceptable post-coating operation of the system) if a polymer coating of the first thickness or average thickness has been formed on at least one sensitive surface, whereas the system is not subject to such fouling if a polymer coating of the same thickness or average thickness has been formed on each nonsensitive surface. In typical fluidized bed polymerization reactor systems, surfaces of distributor plates, coolers, recycle gas lines, and compressor bases are likely to be "sensitive" surfaces, and reactor bed walls are likely to be "nonsensitive" surfaces (in such systems, distributor plates, coolers, recycle gas lines, and compressor bases are more vulnerable to fouling by excessive polymer material than are reactor bed walls).

In the embodiments noted in the previous paragraph, the invention is a method for treating interior surfaces of a fluidized bed polymerization reactor system, said surfaces including at least one sensitive surface (e.g., a distributor plate surface, cooler surface, compressor surface, and/or a recycle line surface) and at least one nonsensitive surface (e.g., a reactor bed wall or portion thereof), said method including the steps of: (a) applying a zinc coating (e.g., a coating of zinc-based paint) to at least one said sensitive surface (e.g., to each said sensitive surface) but not to at least one said nonsensitive surface (e.g., not to any said nonsensitive surface); and (b) after step (a), applying a solution catalyst at least substantially uniformly and in liquid form (e.g., in the form of liquid droplets of the solution catalyst) to each said sensitive surface and each said nonsensitive surface. In some such embodiments, the catalyst component of the solution catalyst is or includes a CCC. For example, the catalyst component of the solution catalyst is or includes chromocene in some preferred embodiments. Typically, the applied solution catalyst is dried (or allowed to dry) to leave a dry coating of catalyst on each said nonsensitive surface (and typically also each said sensitive surface) and a polymerization reaction (catalyzed by the catalyst) is then performed to form on each said nonsensitive surface (and optionally also each said sensitive surface) a polymer coating that reliably functions as an insulating layer that reduces static charging in the reactor system (and thereby reduces the potential for sheeting) during subsequent polymerization reactions in the reactor system. Preferably, the steps are performed such that the polymer coating formed on each nonsensitive surface reliably functions as an insulating layer that reduces static charging in the reactor system (and thereby reduces the potential for sheeting) during subsequent polymerization reactions in the reactor system, without forming an undesirable amount of polymer on any sensitive surface (i.e., without fouling any sensitive surface). This can eliminate the need to clean (or open for cleaning) the reactor system after the polymer coating-forming polymerization reaction (and before subsequent operation of the system to perform a post-coating polymerization reaction), and/or the need to clean (or open for cleaning) the reactor system after the step of applying the solution catalyst (and optionally also subsequent oxidization of the applied catalyst) and before the polymer coating-forming polymerization reaction.

For example, the zinc coating may be applied so as to prevent formation of more than an acceptable amount of polymer on each sensitive surface (e.g., to prevent fouling of the distributor plate and/or compressor with polymer). The zinc coating may be applied (and the other method steps performed) so as to form less polymer on each sensitive surface than on each nonsensitive surface (e.g., the polymer coating formed on each sensitive surface is thinner or has smaller average thickness than that formed on each nonsensitive surface).

In another class of embodiments, the invention is a method for treating at least one interior surface (e.g., a bed wall) of a fluidized bed polymerization reactor system, including the steps of applying a solution catalyst to each said surface, where the catalyst component of the solution catalyst is or includes at least one chromium containing compound ("CCC"), and then (optionally after removal of any excess solvent) introducing oxygen into the system to cause controlled oxidation of at least some of the CCC that has been applied (i.e., to oxidize in a controlled manner at least some of the applied CCC). In some embodiments, the CCC comprises chromocene. In preferred embodiments in this class, the concentration of oxygen in the system during the oxidation step is limited so as not to exceed 200 parts per million by volume (ppm), and more preferably so as not to exceed 100 ppm. In some embodiments, the oxidation step has a controlled duration, preferably so that the oxidation step is completed in less than about two hours (less than about one hour in some embodiments). Typically, a polymerization reaction (catalyzed by the catalyst) is then performed to form on each surface a polymer coating. Preferably the so-formed coating reliably functions as an insulating layer that reduces static charging in the reactor system (and thereby reduces the potential for sheeting) during subsequent polymerization reactions in the reactor system. Preferably, the solution catalyst is applied at least substantially uniformly and in liquid form (e.g., in the form of liquid droplets of the solution catalyst) to each surface. Typically, the applied solution catalyst is dried (or allowed to dry) to leave a dry coating of catalyst on each surface before the oxidation step.

BRIEF SUMMARY OF THE DRAWINGS

FIG. 5 is a top view of another portion of the system partially shown in FIG. 4, showing the position and orientation of a plurality of injection devices 300 located inside a fluidized bed reactor.

FIG. 6 is a graph of the mass (in grams) of polymer formed on test coupons in experiments in which each coupon has been pretreated by depositing an indicated amount (in grams) of chromocene catalyst thereon, either by liquid deposition (as indicated by the diamond-shaped symbols plotted) or vapor deposition (as indicated by the square-shaped symbols plotted).

DETAILED DESCRIPTION

Before the present compounds, components, compositions, and/or methods are disclosed and described, it is to be understood that unless otherwise indicated this invention is not limited to specific compounds, components, compositions, reactants, reaction conditions, ligands, metallocene structures, or the like, as such may vary, unless otherwise specified. It is also to be understood that the terminology used herein is for the purpose of describing particular embodiments only and is not intended to be limiting.

It must also be noted that, as used in the specification and the appended claims, the singular forms "a," "an" and "the" include plural referents unless otherwise specified.

As used herein, all reference to the Periodic Table of the Elements and groups thereof is to the NEW NOTATION published in HAWLEY'S CONDENSED CHEMICAL DICTIONARY, Thirteenth Edition, John Wiley & Sons, Inc., (1997) (reproduced there with permission from IUPAC), unless otherwise noted, for example, with Roman numerals referring to the Previous IUPAC form also contained therein.

For the sake of brevity, definitions provided in the BACKGROUND will not be repeated but are hereby incorporated by reference into this section where relevant.

A class of embodiments is an improved method for polymerizing an alpha-olefin (or other monomer and/or comonomer) in the presence of a catalyst or catalyst system in a fluidized bed reactor having a bed wall (and optionally also at least one other interior surface of the reactor system) that has been pre-coated with a polymer. The polymer coating has been formed in accordance with the invention by a method including the step of applying solution catalyst in liquid form at least substantially uniformly to the bed wall and each other interior surface of the reactor system on which the coating is formed. The polymer coating reduces static charging in the reactor system and thus reduces the potential for sheeting during the polymerization reaction. In some embodiments, the polymer coating is a high molecular weight polymer coating which may have thickness greater than about 10 mils (0.25 mm) on the bed wall of the reactor. Herein, the phrase "high molecular weight polymer coating" denotes a coating comprising at least 25 wt % of an insoluble polymer fraction and a soluble polymer fraction having at least 10 wt % polymers (based upon the total weight of the high molecular weight polymer coating) exhibiting a molecular weight as measured by high temperature GPC (using a trichloro benzene solvent at 150° C., sample prepped at 160° C. for 2 hr, microwaved at 175° C. for 2 hr) of at least one million Daltons or greater.

We shall describe several embodiments of the inventive method with reference to FIGS. 1-5.

Figure 1:
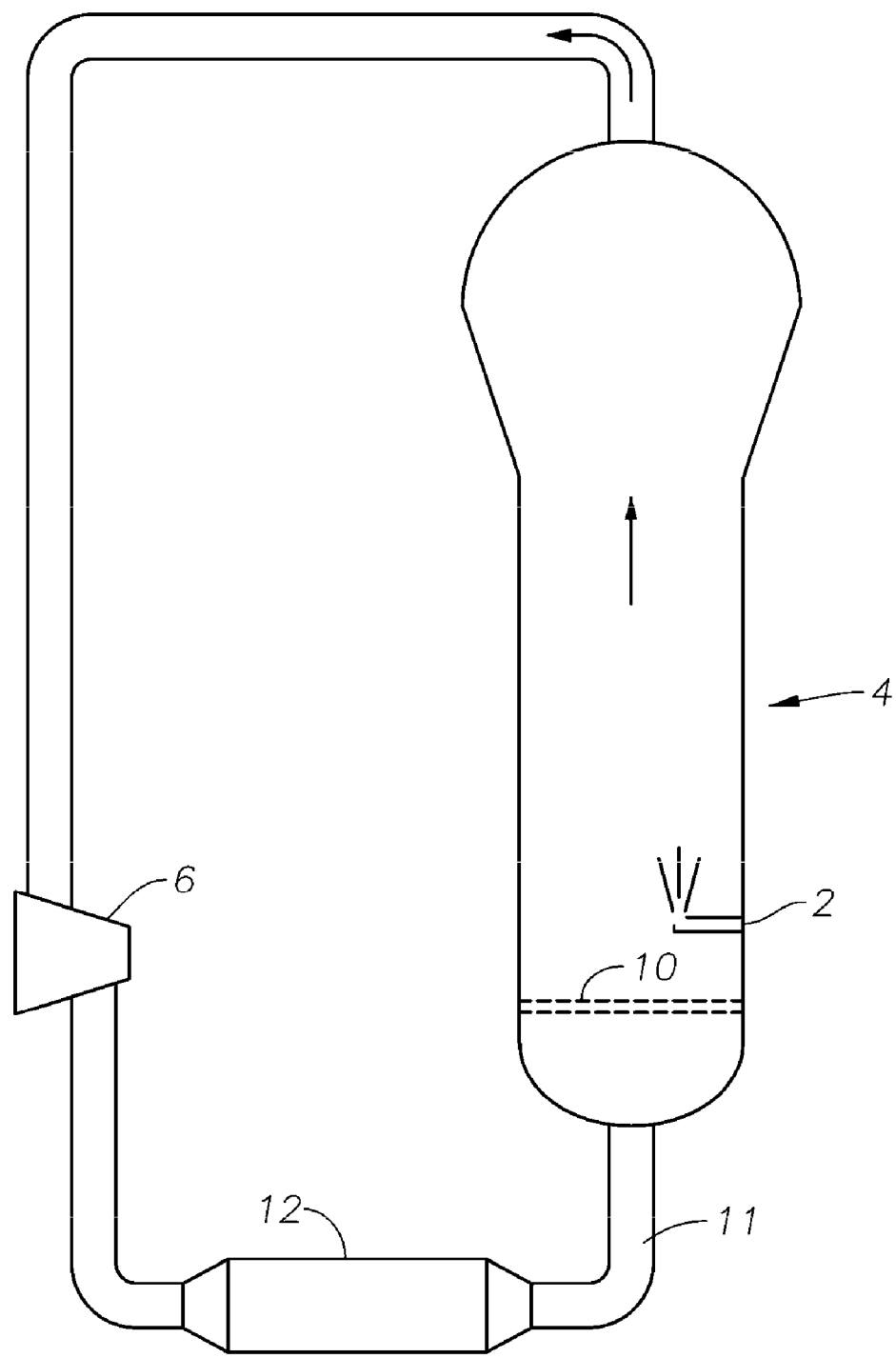
FIG. 1 is schematic diagram of a conventional gas phase polymerization reactor system of the prior art including a tube 2 for injecting solution catalyst into reactor 4.
Figure 2:
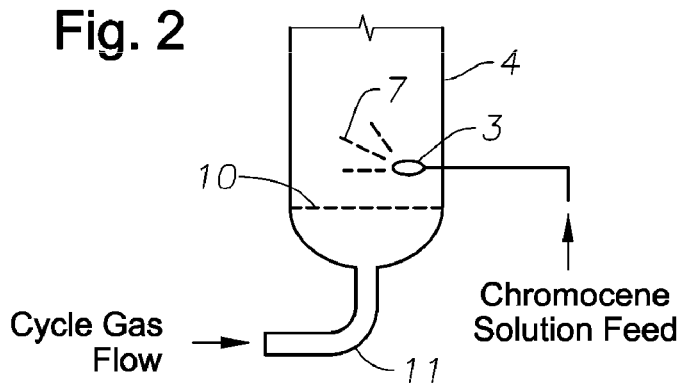
FIG. 2 is a schematic diagram of a portion of a gas phase polymerization reactor system including an atomizing nozzle 3 for injecting solution catalyst into reactor 4.
Figure 3:
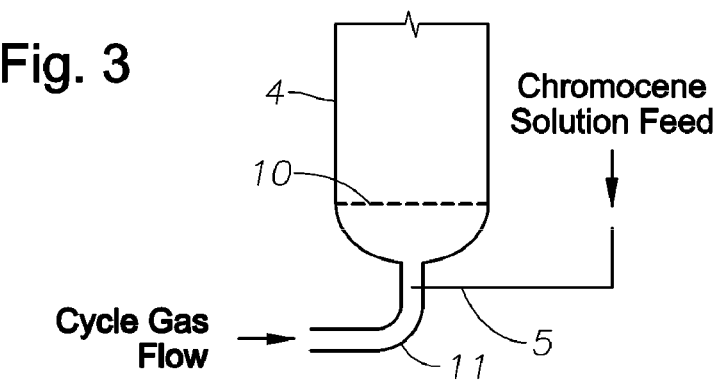
FIG. 3 is a schematic diagram of a portion of a gas phase polymerization reactor system including an injection tube 5 for injecting solution catalyst into recycles line 11.

FIG. 1 is a simplified diagram of a conventional polymerization reactor system including reactor 4 and at least one simple injection tube 2 extending through the side wall of reactor 4. During normal polymerization operation of the system, a fluidized bed is maintained in reactor 4. The interior surfaces of reactor 4 that are in contact with the fluidized bed during normal polymerization operation are referred to as the "bed wall." Prior to normal polymerization, it is desirable to perform an embodiment of the inventive method to pre-coat the bed wall (and optionally also other interior surfaces of the reactor system) with a polymer coating. During the pre-coating method, a solution catalyst is introduced through tube 2 and applied in liquid form to the bed wall and each other interior surface of the system to be pre-coated with polymer, and a special polymerization reaction is then performed in the presence of the applied catalyst to form the polymer coating. This special polymerization reaction is not the normal polymerization reaction normally performed in the reactor after formation of the polymer coating.

With reference to FIG. 1, tube 2 is positioned for injecting solution catalyst (e.g., chromocene solution) into a stream of flowing gas within reactor 4. In a class of embodiments of the inventive method, such a gas stream flows upward through reactor 4 from the outlet of recycle line 11 during application of the solution catalyst in liquid form to the bed wall and each other relevant interior surface of the system. Tube 2 has an inner diameter in the range from about 1/8" to 1/4" in typical implementations, and can be the same catalyst injection tube also used in normal polymerization operation of the reactor system. During both conventional solution catalyst injection and solution catalyst injection in accordance with the invention, solution catalyst is injected through tube 2 into reactor 4 while reactor 4 is empty of polymer and recycle gas compressor 6 causes gas to flow upward through reactor 4 from the outlet of recycle line 11, through holes in distributor plate 10, and to the inlet of line 11. In one implementation in which the solution catalyst is chromocene dissolved in toluene, the atmosphere in reactor 4 during injection of the solution catalyst is nitrogen at a pressure of 5-8 bars, and recycle gas heat exchanger 12 (which normally functions to remove heat during normal polymerization operation of the reactor system) regulates the temperature in the reactor within the range 80-90° C. during injection of the chromocene solution by providing a flow of heat into the system. In some implementations, at least two injection tubes 2 extend through the side wall of reactor 4 (e.g., in the positions and orientations of injection devices 300 in FIG. 5).

In other embodiments, solution catalyst is delivered into a reactor system via one or more injection devices (e.g., tubes) each having an atomizing nozzle at its outlet. An example of such a system is the system partially shown in FIG. 2, which is identical to the FIG. 1 system except in that an injection device (e.g., tube) having an atomizing nozzle 3 at its outlet replaces each simple injection tube 2 of the FIG. 1 system. To treat each interior surface of the FIG. 2 system that is to be coated with a polymer, pressurized solution catalyst is sprayed into reactor 4 by means of atomizing nozzle 3 to produce small droplets 7 (typically having diameter of about 20 microns) of the solution catalyst that become entrained in the gas flow through the reactor system. The droplets eventually contact the bed wall (i.e. the portions of the interior surfaces of the reactor system that are in contact with the fluidized bed during normal polymerization operation of the reactor system), recycle line 11, and distributor plate 10 of the reactor system. In accordance with preferred embodiments, the solution catalyst is deposited at least substantially uniformly in liquid form on the bed wall and optionally also at least substantially uniformly in liquid form on each other surface to be coated with a polymer coating (e.g., recycle line 11 and distributor plate 10).

In other embodiments, solution catalyst is introduced into a gas recycle line (e.g., recycle line 11 of FIG. 3) of a polymerization reactor system by an injection device (e.g., a simple tube) in fluid communication with the recycle line. An example of such a system is the system partially shown in FIG. 3. The FIG. 3 system is identical to the FIG. 1 system except in that it includes an injection device comprising simple tubing 5 (shown in FIG. 3) having an outlet that extends into recycle line 11. Tubing 5 may have an inner diameter in the range 1 mm to 10 mm). Optionally, an atomizing nozzle is fitted at the outlet end of tubing 5 but this is typically not required because a sufficiently high speed (e.g., 15-25 msec) gas flow can be maintained through recycle line 11 to eliminate the need for an atomizing nozzle. Gas flowing with sufficiently high speed and turbulence will induce formation of small droplets of the introduced solution catalyst in line 11 even without an atomizing nozzle, and such solution catalyst droplets will become entrained in the gas flow throughout the system and reach each surface to be treated.

Figure 4:
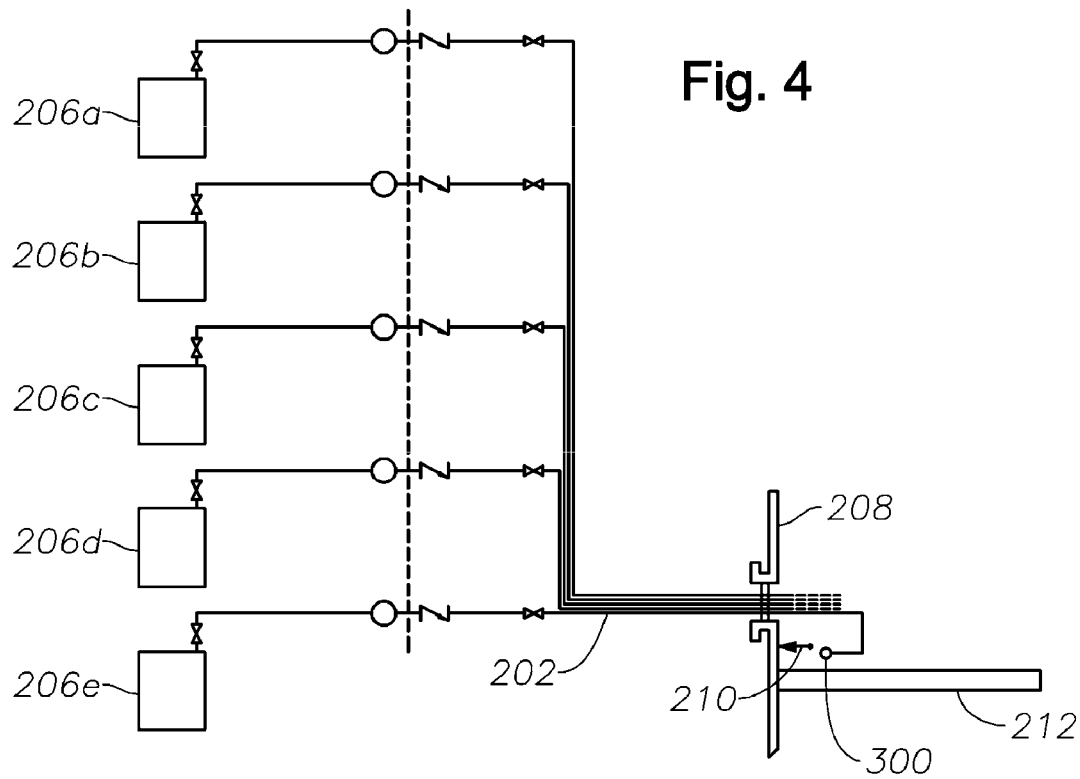
FIG. 4 is a schematic diagram of a portion of a fluidized bed polymerization reactor system in which solution catalyst is introduced into the reactor through injection devices 300.

Other embodiments employ other means for injecting solution catalyst into a polymerization reactor system. To maximize deposition of the solution catalyst (typically a chromium-containing compound in solution) in liquid form on the bed wall on the first pass up the reactor, the injection facilities preferably introduce the solution catalyst at a plurality of locations. In any of the embodiments described herein, solution catalyst may be injected into the reactor system through a plurality of injection devices. In order to achieve good first pass deposition of solution catalyst along the bed wall, the solution catalyst may be introduced at a plurality of locations in such a manner as to create a swirling, catalyst solution-containing cloud that moves up the reactor wall. In any of the embodiments described herein in which injection devices (e.g., spray nozzles) introduce solution catalyst into a generally cylindrical reactor, the spacing between the injection devices may be at least substantially equidistant around the reactor circumference. Referring to FIG. 4, injection devices 300 (which are simple tubes in some implementations and tubes with atomizing nozzles at their outlet ends in other implementations) may be attached to tubing 202 that travels through bulkhead fittings 204 to individual cylinders 206a-206e containing solution catalyst (e.g., chromium-containing catalyst in solution). The injection system may be constructed inside the reactor after the reactor is cleaned, for example, by grit blasting, in preparation for the treatment.

Still referring to FIG. 4, the solution catalyst may be introduced at a plurality of locations in proximity to a lower section of bed wall 208 of a fluidized bed reactor. For the purposes of this specification, the locations are considered in proximity to the bed wall 208 if they are close enough such that the particular injection device selected and flow rate used effectively deliver the solution catalyst directly to the bed wall by droplets actually contacting the bed wall. In any of the embodiments described herein, the solution catalyst may be introduced, for example, by spray nozzle, at a location that is located at a distance "A" 210 from the wall, wherein "A" 210 may be about 0.1 to about 0.5 meters. In other embodiments, "A" 210 may be in the range from about 0.1 to 0.2 meters, or may be about 0.12 meters.

As used herein, the lower section of the bed wall 208 refers to the first 2.5 meters of the fluidized bed reactor where the fluidized bed contacts the reactor wall(s). In the gas phase reactor partially shown in FIG. 4 (which contains a distributor plate 212), this is the 2.5 meters above distributor plate 212. In any of the embodiments described herein, solution catalyst may be introduced about 0.15 to about 2.0 meters above the distributor plate, about 0.15 to about 1.0 meters above the distributor plate, about 0.4 to 0.6 meters above the distributor plate, or about 0.5 meters above the distributor plate.

Referring to FIG. 5, in any of the embodiments, a plurality of injection devices 300 may be used to introduce the solution catalyst into a reactor having wall 302. Each injection device 300 may be oriented relative to the reactor wall 302 at an angle θ 306 in from wall tangent 304, and angled 40-50° upward (out of the plane of FIG. 5) from horizontal to facilitate a swirling, solution catalyst-containing cloud that moves up the reactor wall. In any of the embodiments described herein, the angle θ 306 may be between about 40 to about 50°.

In other embodiments, the angle θ 306 may be in the range 45-50° and each injection device 300 may be angled about 45° up from horizontal.

Any injection device may be employed that facilitates dispersion of a solution catalyst (e.g., a chromium-containing compound in an inert solvent) suitable for performing the inventive method. Tests to simulate reactor conditions during injection may be conducted to help facilitate the selection of injection devices. In any of the embodiments described herein, the injection devices may have spray nozzles at their outlets, for example, 110° V-jet Nozzles (model H1/4VV11006 supplied by Spraying Systems Company). A 2.75 BAR nozzle differential pressure (DP) may be used to achieve a desired 2 kg/min flow rate through the 110° V-jet Nozzles.

Referring again to FIG. 5, spacing of the plurality of locations for introducing the solution catalyst depends on the diameter of the fluidized bed reactor being treated, the placement of the injection devices, and the orientation and spray pattern 310 of each injection device. In some embodiments, the injection devices are placed to assure that the lower portion of bed wall 302 is directly impacted with liquid spray from the injection devices substantially all the way around the circumference of the reactor. In some embodiments, the injection devices are placed so as to minimize significant overlap of their spray patterns. In any of the embodiments described herein, the injection devices may be spray devices, for example, spray nozzles each having a spray pattern 310 spanning about 100 to 120° C., and may be placed such that a chord length 308 between each of the injection devices is about 1.5 to about 1.9 meters.

In any of the embodiments described herein, solution catalyst may be introduced via a plurality of injection devices, each having a spray angle 310 of about 100 to 120° C., each located about 0.10 to 0.20 meters (dimension "A" 312) from the bed wall 302, each placed such that a chord length 308 between adjacent injection devices is about 1.5 to about 1.9 meters, each angled 40-50° (angle θ 306) inward from wall tangent 304, and each angled 40-50° up from horizontal. In other embodiments, the injection devices may be located about 0.4 to 0.6 meters above the distributor plate.

Prior to introducing a solution catalyst into a reactor system in accordance with the invention, the system may be prepared for treatment. The preparations may include: removing fixed tee-pees (resin back-flow preventors above the holes in the distributor plate); cleaning (for example, by grit blasting) the expanded section, dome, reactor walls, distributor plate, and bottom head; cleaning (for example, by hydroblasting) the cycle gas piping to remove polymer crust; installing injection equipment; and any other requirements necessary to protect specific components (e.g., expansion bellows, valves, and flow venturis).

In any of the embodiments described herein, the solution catalyst is introduced into the fluidized bed reactor by injecting the fluid during a time interval whose duration depends on factors including the injection device(s) employed, the placement of the injection device(s), and the composition of the solution catalyst. An optimal period of time for solution catalyst injection may be determined. The spray characteristics of the injection devices may require a specific flow rate to each injection device to provide an optimal flow pattern. The duration of the injection interval depends on the flow rate required for the injection device selected, the amount of solution catalyst to be injected, the number of injection devices selected, and the number of injection devices used at one time. In some embodiments, the solution catalyst is introduced through one injection device at a time; in others it is injected through at least two injection devices at a time. In some embodiments, solution catalyst is introduced into a fluidized bed reactor for a time interval of duration less than one hour (e.g., of duration in the range from about 15 to about 30 minutes).

During and after introduction of solution catalyst into the fluidized bed reactor system, a non-reacting gas is preferably circulated through the system. The gas may circulate for a first period of time before the solution catalyst is introduced, and may continue to circulate for a second period of time after the solution catalyst is introduced while the solution catalyst is dispersed and deposited in liquid form at least substantially uniformly on the bed wall. Preferably, the second period of time is less than about 5 hours (and more preferably is less than about 1 hour). In some embodiments, the gas circulates at a temperature of about 80 to 90° C. with a cycle gas velocity ("CGV", or superficial gas velocity or "SGV") in the range from about 0.35 to about 0.45 meters/sec. Herein, CGV denotes the volumetric flow of the cycle gas fluidization stream divided by the cross sectional area of the fluid bed section of the reactor.

In some embodiments, solution catalyst is deposited on the bed wall of the fluidized bed reactor rather than on other surfaces in the reaction loop, such as the cycle gas piping, cycle compressor, cycle cooler, and bottom of the distributor plate.

In some embodiments, after solution catalyst has been deposited in liquid form at least substantially uniformly on the bed wall (and each other interior surface to receive a polymer coating), the deposited catalyst is "oxidized" by injecting oxygen into the reaction system before forming the polymer coating and while the non-reacting gas continues to circulate. Typically, the oxidizing step is completed in less than about 2 hours (and less than about one hour in some embodiments). In some cases in which the deposited catalyst is a CCC, the CCC reacts with oxygen during the oxidizing step such that one of the cyclopentadienes is replaced and the chromium is oxidized. During the subsequent coating-forming polymerization reaction, a cocatalyst (e.g., tri-ethylaluminum (TEAl)) reduces the chromium back to the desired valence state, for example, a valence state of plus 2 to 3. By minimizing both the level and duration of oxygen exposure, the activity of the chromium is maintained at higher levels and the time to purge out the inert solvent is reduced. The higher chromium activity can result in formation of a thicker polymer coating (e.g., a thicker high molecular weight polymer coating) over a shorter period of time when the catalyst is reacted with a monomer.

In any of the embodiments described herein, the amount of oxygen added to the reactor during the oxidation step may be limited by limiting the amount of oxygen added to a substantially stoichiometric amount relative to the amount of chromium introduced into the fluidized bed reactor. In other embodiments, the amount of oxygen may be greater than a substantially stoichiometric amount relative to the chromium introduced into the fluidized bed reactor. In other embodiments, the amount of oxygen added to the reactor may be limited by limiting the concentration of oxygen in the reactor to less than about 200 parts per million by volume (ppmv), or less than about 100 ppmv. In other embodiments, the oxygen added may be less than about 100 ppmv, and the time of the oxidizing step is less than about 1 hour. In further embodiments, the oxidizing step may be completed without venting any non-reacting gas from the reaction system to prevent releasing un-oxidized chromium from the reaction system.

In some embodiments, 1.0 kg of air is introduced per kg of CCC injected. The air may be supplied from pressurized breathing air cylinders (one such cylinder typically contains approximately 10 kgs of air). In other embodiments, an initial amount of air is added to the reactor, a conventional analyzer measures the level of oxygen in the reactor, and then additional air may be added incrementally until an analyzer reading of approximately 100 ppmv is achieved. In some embodiments, the oxidizing step may be conducted while circulating the non-reacting gas at a CGV of about 0.35 to about 0.45 meters/sec and a temperature of about 80 to about 90° C.

In a class of embodiments, the method includes the step of reacting a CCC or other solution catalyst that has been deposited in liquid form in accordance with the invention and oxidized, to form a high molecular weight polymer coating on the bed wall (and optionally on at least one other interior surface) of a fluidized bed reactor system without opening the system for cleaning after the oxidation step and before the polymer coating-forming polymerization reaction. In contrast, in some conventional methods, the reactor system is cleaned to remove excess CCC deposited on surfaces of the cycle piping, cycle compressor, cycle cooler, and/or distributor plate before the CCC is reacted to form a polymer coating. Without being bound by theory, it is believed that such cleaning is required because the conventional method circulates and deposits a significant amount of CCC throughout the reactor system, rather than depositing it preferentially on the bed wall. In some embodiments in which it is desired to form the polymer coating only on the bed wall, the polymer coating can be formed without first cleaning the reactor system because the solution catalyst is deposited preferentially on the bed wall; not on other interior surfaces of the system. Thus, in one class of embodiments, the deposited catalyst is reacted with a monomer (e.g., ethylene) to form a polymer coating (e.g., a high molecular weight polymer coating) on the bed wall after the catalyst has been oxidized and before opening the reactor system for cleaning.

In any of the embodiments described herein, the level of oxygen and inert solvent (the solvent component of the deposited solution catalyst) may be reduced by purging the reactor system before the deposited catalyst is reacted with a monomer to form a polymer coating. For example, the fluidized bed reactor system may be purged to less than about 1 ppmv oxygen and less than about 100 ppmv of inert solvent before the deposited catalyst is reacted with the monomer.

In any of the embodiments described herein, catalyst that has been deposited on the bed wall (and optionally on at least one other interior surface) of a reactor system and oxidized may catalyze a polymerization reaction in which a monomer (e.g., ethylene) is polymerized to form a high molecular weight polymer coating on the bed wall (and each other interior surface). Optionally, the polymerization is performed in the presence of a cocatalyst to form the high molecular weight polymer coating. During the polymerization step, the reactor system may be first heated to about 80 to 90° C. and the pressure of non-reactive gas in the reactor may be established at about 5 BARG after purging is complete. Next, the monomer may be fed to establish about 4 BARA of monomer partial pressure. In some embodiments, there may be greater than about 4 BARA of monomer in the reactor before introducing a cocatalyst, to prevent the cocatalyst from reacting with the deposited catalyst the absence of monomer, which is thought to reduce the effectiveness of the polymerization. The cocatalyst may be an organometal compound, e.g., tri-ethylaluminum (TEAl), and may be fed in at a uniform rate over about a 60 minute period. Reactor pressure and monomer partial pressure typically rise during the cocatalyst injection and reacting period due to various system purges routinely fed to the reactor system. In any of the embodiments described herein, the feeding period may be completed without performing a reactor vent. In some embodiments, the partial pressure of monomer (e.g. ethylene) may be about 5 to about 20 BARA during the polymerization reaction. In other embodiments, feed flows into the reaction system (monomer and inert purges) are balanced such that 100% of the cocatalyst is charged before the reactor total pressure reaches a maximum allowable level (which may require venting), and before the monomer partial pressure reaches about 10 BARA.

The amount of cocatalyst (e.g., TEAl) fed may (optionally, in order of priority): provide sufficient cocatalyst to activate at least about 75% of the deposited catalyst; be limited to ensure any liquid cocatalyst film on reactor walls vaporizes by the midpoint (on a time basis) of the reacting step; provide that cocatalyst starvation will not occur before about 5 to about 15 hours, or about 10 hours, before the end of the reacting step (depends on cocatalyst charge, vent rate, and impurity levels); and provide minimal residual cocatalyst at the end of the reacting step. In some embodiments, the amount of cocatalyst fed in may be about 0.5 to about 4.0 kilograms per kilogram (or about 1.0 to about 2.0 kilograms) of deposited catalyst.

Excessive reactor venting, and the levels of impurities in the reaction system and system feeds, may change the effective cocatalyst/catalyst (e.g., TEAl/CCC) ratio. For a fixed amount of cocatalyst fed, cocatalyst is effectively removed from the system by venting and by reacting with poisons. For example, venting results in a loss of cocatalyst with the vented gas, and thus less active cocatalyst available to react with the deposited chromium. The effective cocatalyst/chromium ratio is lowered by the loss of cocatalyst, and the catalyst activity may drop. Thus, in any of the embodiments described herein, the amount of cocatalyst introduced into the fluidized bed reactor may be adjusted for either high feed impurities and/or high venting rates. For the purposes of this application, a level of impurities of 4 ppmv or higher is considered a high impurity level. A high venting rate will depend on the size of the reaction system. In one embodiment, wherein the reaction system is a 4.9 meter diameter reactor vessel, a venting rate above about 1,500 kgs/hour is a high venting rate.

Another method of determining the cocatalyst feed amount is to fix the level of cocatalyst feed based on experience or after some experimentation. Thus, in some embodiments, about 1.7 to about 2.3 kgs of TEAl per kg of active chromocene may charge to the reactor. In other embodiments, all feeds to the reactor comprise less than 2.0 ppm poisons. In other embodiments, a vent rate of about 10% of the reaction system contained gas mass at about 80 to 90° C. and about 16 to 20 BARG may be established while forming the high molecular weight polymer coating. Furthermore, in any of the embodiments described herein, the amount of TEAl fed may be controlled such that there may be no substantial liquid TEAl present on any reactor surface after about 30 hours of reacting. In other embodiments, substantially all of the cocatalyst, for example TEAl, is depleted after about 50 hours of reacting.

After the cocatalyst feed is complete, the polymer coating-forming polymerization reaction may further comprise a soaking step, wherein the non-reactive gas and the monomer are circulated for greater than about 40 (or 60) hours. During the soaking step, the deposited catalyst (e.g., CCC) continues to react with the monomer in the presence of the cocatalyst to form the polymer coating. During the soaking step, reactor venting to control pressure may be required. Flows into the reaction system and all equipment in the reaction system may be minimized to minimize the required venting and thus the loss of cocatalyst from the fluidized bed reactor. In any of the embodiments described herein, the reaction system may be held at about 80 to 90° C. at a pressure of about 15 to about 25 BARG while the non-reactive gas and monomer are circulated at a CGV of about 0.6 to about 0.70 meters/second.

In any of the embodiments described herein, the soaking step may be followed by deactivating the cocatalyst. The cocatalyst may be deactivated by feeding carbon dioxide ($CO_2$) to the fluidized bed reactor. The $CO_2$ may be fed to achieve a concentration of greater than about 0.5 mol % in the fluidized bed reactor. Furthermore, the $CO_2$ may be circulated for at least about 1 hour.

In other embodiments, the cocatalyst may be hydrolyzed prior to opening the fluidized bed reactor for inspection and cleaning. In any of the embodiments described herein, the fluidized bed reactor may be hydrolyzed by adding water or steam to achieve a concentration of greater than about 300 ppmv, or greater than about 450 ppmv, of water in the fluidized bed reactor and circulating for at least about 1 hour.

After reacting deposited solution catalyst (e.g., CCC) to form a polymer coating on the bed wall (and optionally at least one other interior surface), the fluidized bed reactor may be opened for inspection and cleaning. The cocatalyst may be deactivated as discussed above before opening the reactor and exposing it to the air. While the reactor is open, the injection equipment may be removed, the internals may be inspected and cleaned as required, and measurements may be taken to assure the surfaces of the bed wall were properly treated. Measurements that may be taken include charge decay measurements, chromium level measurements, or coating thickness measurements. The bed wall, expanded section, cycle piping, cycle cooler, and cycle compressor may be inspected and cleaned as required. Rough surfaces may be scraped or polished to provide a smooth surface. In any of the embodiments described herein, the bed wall may be polished, for example by hand scraping, to provide a smooth bed wall. In other embodiments, the distributor plate may be cleaned, for example, by drilling and/or grit blasting, to remove most or substantially all of the chromium and high molecular weight polymer from the surfaces. In other embodiments, the fixed tee-pees removed before introducing the solution catalyst may be replaced with new tee-pees or removable deck plate-type flow deflectors during the cleaning step.

In any of the embodiments described herein, a scrub bed may be charged to the fluidized bed reactor, fluidized, and dumped following the cleaning step to remove any grit or other loose material contaminants left in the reactor system during the cleaning step.

After a polymer coating has been formed on the bed wall (and optionally at least one other interior surface) of a fluidized bed reactor that has been pre-treated in accordance with the invention, and after the reactor has been cleaned, the reactor may be placed in or returned to routine commercial service. Typically, any of a broad range of commercial polymer products may be produced in the treated reactor system immediately after the coating formation and cleaning, by a polymerization reaction catalyzed with any of a wide variety of catalyst systems (e.g., a Phillips-type chromium catalyst system, a Ziegler-Natta catalyst system, or a metallocene catalyst system).

After a fluidized bed polymerization reactor system is fabricated but before it undergoes a chromocene treatment (or another treatment preparatory to formation of a polymer coating on one or more interior surfaces thereof), surfaces of the system are sometimes painted with a zinc based paint to prevent rust from forming on the painted surfaces before they are treated. Such a zinc coating may be applied when the system is expected to be stored for a significant time before undergoing the treatment and then entering into service. As a result of observations of polymerization reactor systems and tests on metal foil coupons (some painted with zinc-base paint, and others unpainted), the inventors have come to appreciate that when a chromocene treatment is performed on a zinc-coated surface of a polymerization reactor system, the treatment surprisingly is less effective as a preliminary to polymer formation than if the surface were bare (not zinc-coated). During the tests, the coupons were subjected to a standard chromocene treatment. Then, a polymerization reaction was performed to produce a polymer coating on the treated coupons. Molecular weight, elemental composition, film thickness, and electrical properties of the polymer coatings were then measured. The electrical properties were measured using a charge decay technique in which a corona voltage was applied to each coated coupon and voltage retention as a function of time was then determined.

Figure 7:
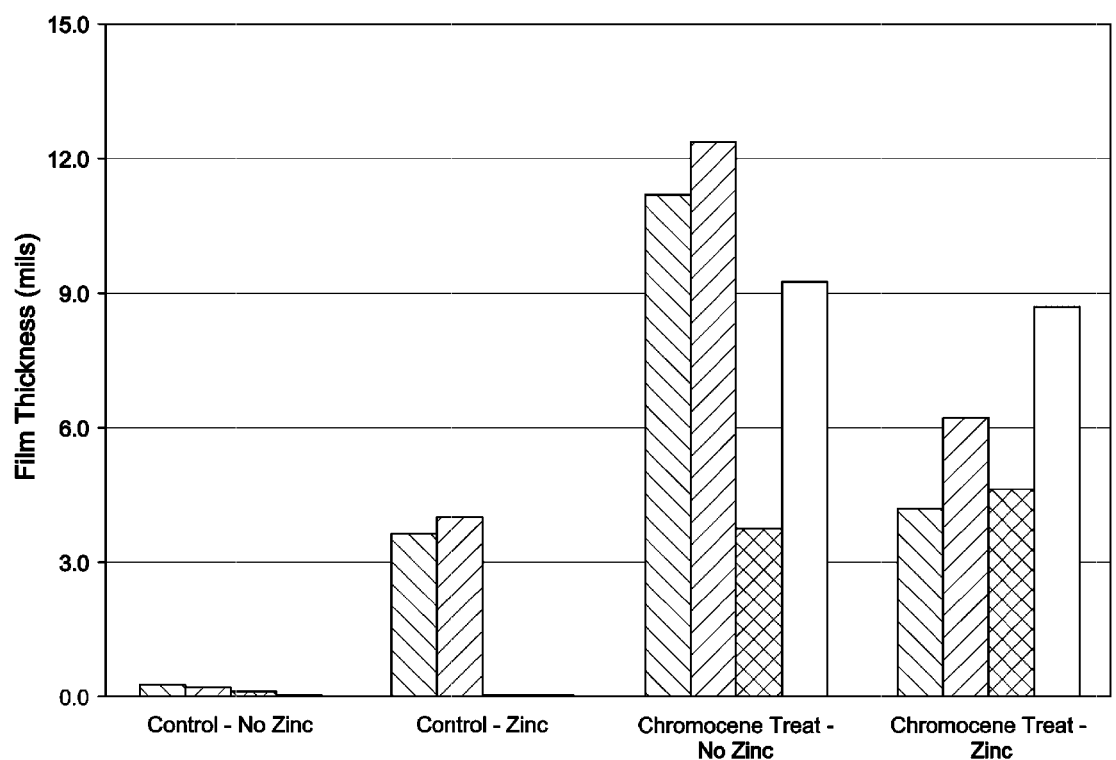
FIG. 7 is a plot of measured film thicknesses on a set of metal coupons.

The tests on coupons (and observations on reactor systems) suggested that the molecular weight and weight distribution of the polymer coated on surfaces of a reactor system (as a result of chromocene treatment followed by coating-forming polymerization) does not depend on whether the surfaces are zinc-coated before the treatment. This result was confirmed by measurements of scrapings of polymer coatings formed on actual reactor surfaces, some of which had received zinc coatings prior to chromocene treatment and some of which had not received zinc coatings prior to chromocene treatment. However, the coupon tests suggested that in typical cases less polymer is formed on a zinc-coated (and then treated) surface than would be if the surface were bare before chromocene treatment (the amount of polymer formed on the coupons having zinc-coated surfaces prior to chromocene treatment averaged about 80% less than on the coupons that had not received a zinc coating before chromocene treatment). The latter result is apparent from FIG. 7, a set of bar graphs indicative of measurements obtained during the above-mentioned tests of film thicknesses (in units of mils) on various coupons. In FIG. 7, the four values labeled "Control-No Zinc" are measured film thicknesses on a first set of four bare metal coupons; the two values labeled "Control-Zinc" are measured zinc coating thicknesses on a second set of two metal coupons painted with zinc-based paint (neither of which had received chromocene treatment or were present during a polymerization reaction); the four values labeled "Chromocene Treat-No Zinc" are measured thicknesses of polymer coatings formed on a third set of four metal coupons by performing chromocene treatment on the coupons (without first applying a zinc coating thereto) and then performing a polymerization reaction (catalyzed by the applied catalyst) on the treated coupons; and the four values labeled "Chromocene Treat-Zinc" are measured thicknesses of polymer coatings formed on a fourth set of four zinc-coated metal coupons by performing the same chromocene treatment on the coupons and then performing the same polymerization reaction (catalyzed by the applied catalyst) on the treated surfaces. Before forming the polymer coating on the coupons in the fourth set, the coupons in the fourth set were painted with the same zinc-based paint and in the same manner as the coupons in the second set were painted. As apparent from FIG. 7, the applied zinc coating (coating of zinc-based paint) had an average thickness of about 3 mils, and the average thickness of the polymer coating formed on the coupons in the third set was much greater than the average thickness of the polymer coating (excluding the zinc-coating thickness) formed on the coupons in the fourth set.

It also became apparent from the tests on coupons also that the polymer formed on a zinc-coated, chromocene treated reactor system surface is typically less effective to prevent generation of undesirable levels of static charge and sheeting during operation of the reactor system to produce PE resin than if the surfaces were bare at the start of treatment, and that the system's static charging characteristics is likely to be more sensitive to characteristics of the product being produced if the coated surfaces were zinc-coated at the start of chromocene treatment than if the surfaces were bare at the start of chromocene treatment.

By studying coupons that were zinc-coated before chromocene treatment, it was also observed that the zinc coating on each coupon had a dense bottom layer and a more porous upper layer, the chromocene treatment resulted in incorporation of a significant amount of chromocene catalyst in the zinc coating's upper layer, and the catalyst incorporated in the zinc coating's upper layer did not participate in formation of a polymer coating on any coupon during a post-chromocene-treatment polymerization operation.

Often, a polymer coating-forming polymerization operation on a non-zinc-coated polymerization reactor system (preliminary to normal operation of the system) causes fouling of components of the system. The inventors have come to appreciate that such fouling is caused by excessive polymer formation on some interior surfaces of the system during the polymer coating-forming polymerization operation. In particular, distributor plates, coolers, recycle gas lines, and compressor bases are likely to be fouled by formation of excess polymer on surfaces thereof. Often, the system must be opened and cleaned to remove the excess polymer material before it can be placed into service.

In a class of embodiments, the present invention is an improved method for treating interior surfaces of a fluidized bed polymerization reactor system preliminary to (or as a step of) a polymer coating-forming polymerization operation on the system, to reduce substantially (and preferably prevent) fouling of the system by excess polymer produced during the polymer coating-forming polymerization operation. The system includes at least one element (e.g., a component or part) subject to fouling if an excessive amount of polymer coating material is formed on at least one surface of the system (an interior surface of the system to be referred to as a "sensitive" surface) during performance of the method (or during a polymerization operation following performance of the method), and the system also has at least one other interior surface (to be referred to as a "nonsensitive" surface) that does not cause fouling of any element of the system if excess polymer is formed thereon. Thus, the system is less subject to fouling by polymer coating material formed on any said "nonsensitive" surface (during performance of the method or during a polymerization step following performance of the method) than by polymer coating material formed on any said "sensitive" surface in the following sense: during post-coating operation of the reactor system (i.e., operation after formation of the polymer coating on each sensitive and nonsensitive surface) the system can operate acceptably if a polymer coating of a first thickness (or first average thickness) has been formed on the nonsensitive surface, but the system cannot operate acceptably with a polymer coating of the first thickness (or the first average thickness) has been formed on at least one said sensitive surface. In other words, the system is subject to fouling (of a type that prevents acceptable post-coating operation of the system) if a polymer coating of the first thickness or average thickness has been formed on at least one sensitive surface, whereas the system is not subject to such fouling if a polymer coating of the same thickness or average thickness has been formed on each nonsensitive surface. In typical fluidized bed polymerization reactor systems, surfaces of distributor plates, coolers, recycle gas lines, and compressor bases are likely to be "sensitive" surfaces, and reactor bed walls are likely to be "nonsensitive" surfaces (in such systems, distributor plates, coolers, recycle gas lines, and compressor bases are more vulnerable to fouling by excessive polymer material than are reactor bed walls).

In the embodiments noted in the previous paragraph, the invention is a method for treating interior surfaces of a fluidized bed polymerization reactor system, said surfaces including at least one sensitive surface (e.g., a distributor plate surface, cooler surface, compressor surface, and/or a recycle line surface) and at least one nonsensitive surface (e.g., a reactor bed wall or portion thereof), said method including the steps of: (a) applying a zinc coating (e.g., a coating of zinc-based paint) to at least one said sensitive surface (e.g., to each said sensitive surface) but not to at least one said nonsensitive surface (e.g., not to any said nonsensitive surface); and (b) after step (a), applying a solution catalyst at least substantially uniformly and in liquid form (e.g., in the form of liquid droplets of the solution catalyst) to each said sensitive surface and each said nonsensitive surface. In some such embodiments, the catalyst component of the solution catalyst is or includes a CCC. For example, the catalyst component of the solution catalyst is or includes chromocene in some preferred embodiments. Typically, the applied solution catalyst is dried (or allowed to dry) to leave a dry coating of catalyst on each said nonsensitive surface (and typically also each said sensitive surface) and a polymerization reaction (catalyzed by the catalyst) is then performed to form on each said nonsensitive surface (and optionally also each said sensitive surface) a polymer coating that reliably functions as an insulating layer that reduces static charging in the reactor system (and thereby reduces the potential for sheeting) during subsequent polymerization reactions in the reactor system. Preferably, the steps are performed such that the polymer coating formed on each nonsensitive surface reliably functions as an insulating layer that reduces static charging in the reactor system (and thereby reduces the potential for sheeting) during subsequent polymerization reactions in the reactor system, without forming an undesirable amount of polymer on any sensitive surface (i.e., without fouling any sensitive surface). This can eliminate the need to clean (or open for cleaning) the reactor system after the polymer coating-forming polymerization reaction (and before subsequent operation of the system to perform a post-coating polymerization reaction), and/or the need to clean (or open for cleaning) the reactor system after the step of applying the solution catalyst (and optionally also subsequent oxidization of the applied catalyst) and before the polymer coating-forming polymerization reaction. For example, the zinc coating may be applied so as to prevent formation of more than an acceptable amount of polymer on each sensitive surface (e.g., to prevent fouling of the distributor plate and/or compressor with polymer). The zinc coating may be applied (and the other method steps performed) so as to form less polymer on each sensitive surface than on each nonsensitive surface (e.g., the polymer coating formed on each sensitive surface is thinner or has smaller average thickness than that formed on each nonsensitive surface).

The inventors have performed tests using iron foil coupons to simulate the effects of different methods of chromocene deposition on the coupons and subsequent formation of polymer coatings on the coupons by exposing the coupons on which catalyst has been deposited ("treated" coupons) to ethylene and a poison scavenger/cocatalyst (e.g., tri-ethyla-luminum (TEAL) or another aluminum alkyl) and performing a polymerization reaction catalyzed by the deposited chromocene and the poison scavenger/cocatalyst. Test results are shown in FIG. 6 and Table 1 below.

The metal foil coupons were coated with chromocene by one of two methods described below: vapor or liquid deposition. The coupons were rectangular in shape, measuring 1×1.5 inches (2.2×3.3 cm), and were composed of 99.5 pure iron (Fe).

Vapor deposition of the solution catalyst on the coupons was performed as follows. A solution of chromocene in toluene was prepared in a dry box by dissolving 80 mg of solid, powdered chromocene in 2 milliliters of toluene. This solution was then transferred to a crystallization dish, which measured approximately 10 cm in diameter and 5 cm in depth. The toluene was removed with a nitrogen purge to produce a thin, dry coating of chromocene at the bottom of the crystallization dish. After recording their tare weights, six foil coupons were taped to an aluminum foil, which was then placed over the top of the dish, exposing the bottom surfaces of the coupons to the chromocene in the dish. The chromocene was sublimed from the crystallization dish by heating the dish on a hot plate at 100° C. for 30 minutes. The coupons were then removed from the crystallization dish and weighed again to determine the amounts of chromocene that had been deposited (or adsorbed) on the surface. Measured chromocene content on several coupons prepared by this method ranged from approximately 1 to 7 milligrams, as shown by the diamond-shaped symbols plotted in FIG. 6.

Liquid deposition of the solution catalyst on the coupons was performed as follows. An 8 wt. solution of chromocene in toluene was prepared in a nitrogen purged dry box by adding 1.88 grams of solid, powdered chromocene to 25 milliliters of toluene. For each coupon sample prepared by this method, 0.1 milliliters of this solution (containing approximately 7.5 mg of dissolved chromocene) was withdrawn by a syringe. The solution was then added drop wise to the upper surface of a coupon sample (after recording its tare weight) to produce an evenly distributed solution coating. The toluene was then removed with a nitrogen purge. The coupon was then heated in a beaker at 70° C. for 20 minutes. The coupon was then weighed again to determine the amount of chromocene that had been deposited on the surface. The measured chromocene content on several coupons prepared by this method ranged from approximately 2 to 11 milligrams, as shown by the square-shaped symbols plotted in FIG. 6.

Prior to each polymerization experiment, a different one of the chromocene coated coupons (prepared by either the vapor or liquid deposition method) was exposed to ambient air for 30 minutes to oxidize the chromocene. The coupon was then placed in an autoclave reactor, which was then purged with substantially pure ethylene to remove atmospheric air and moisture, and heated to 90° C. The ethylene pressure in the reactor was then raised to 100 psig (790 kPa), and the reactor was then charged with 1.0 mmol of TEAl to initiate reaction. The ethylene pressure was then immediately raised to 150 psig (1,130 kPa), and maintained for 16 hours (or in some cases 8 or 38 hours as indicated in FIG. 6) to allow polymer to grow (i.e., polymerize) on the surface of the iron foil coupons. The reactor was then vented, and the coupon was removed and weighed to determine the amount of polymer that had been produced.

FIG. 6 shows a comparison of the polymer produced on the chromocene treated coupons, as prepared by the two deposition methods. The samples produced by vapor deposition are shown as the diamond-shaped symbols in FIG. 6. The samples produced by liquid deposition are shown as the square-shaped symbols. It is clear from FIG. 6 that, on average, much more polymer was produced by the solution deposition method. At equivalent polymerization conditions (16 hours of reaction), the coupons treated by solution deposition produced an average of 0.067 grams of polymer, whereas the coupons treated by vapor deposition produced an average of approximately 0.012 grams of polymer. The amount of polymer coated using liquid deposition of solution catalyst was thus increased (on the average) by a large factor relative to the amount produced using vapor deposition of the catalyst.

The increased amount of polymer coated on the coupons using liquid deposition of solution catalyst was not simply the result of higher concentrations of chromocene deposited on the surface of the coupons. As can be seen in FIG. 6, increased amounts of polymer were produced by the solution deposition method over the full range of chromium concentrations tested. This may be because the chromocene deposited by liquid deposition has (for some reason) more catalytic activity than chromocene deposited by vapor deposition.

It is apparent from FIG. 6 that the amount of polymer produced (using catalyst deposition by either method) was independent of the amount of the chromocene deposited on the coupons (i.e., the chromocene loading). In other words, the catalytic activity appears to depend on the method of deposition, and not on the chromocene loading.

The amount of polymer coated on the coupons appears to depend on the time that the coupons were exposed to TEAl and ethylene, as shown in Table 1 below. For example, in the case of liquid deposition of solution catalyst, the amount of polymer coated was increased from 0.110 to 0.60 grams when the reaction time was increased from 6 to 38 hours.

TABLE 1

Average amount of polymer (in grams) coated on coupons in coupon tests

| Polymerization Reaction Time (hrs) | Liquid Deposition of Solution Catalyst | Vapor Deposition of Solution Catalyst |
|---|---|---|
| 6 | 0.110 g | NA |
| 16 | 0.067 g | 0.012 g |
| 38 | 0.260 g | 0.028 g. |

In some of the embodiments described herein, the solution catalyst is a chromium-containing compound in solution. In some such embodiments, the chromium may be present in the reactor at a valence of plus 2 or 3 (the chromium may be fed in a 2 to 3 valence or converted to a 2 to 3 valence after being introduced). Chromium-containing compounds may include, but are not limited to bis(cyclopentadienyl) chromium (II) compounds having the following formula:

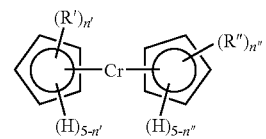

wherein R' and R" may be the same or different $C_1$ to $C_{20}$ inclusive, hydrocarbon radicals, and n' and n" may be the same or different integers of 0 to 5, inclusive. The R' and R" hydrocarbon radicals may be saturated or unsaturated, and may include aliphatic, alicyclic and aromatic radicals such as methyl, ethyl, propyl, butyl, pentyl, cyclopentyl, cyclohexyl, allyl, phenyl and naphthyl radicals. Other specific compounds that may be suitable include chromic acetyl acetonate, chromic nitrate, chromous or chromic acetate, chromous or chromic chloride, chromous or chromic bromide, chromous or chromic fluoride, chromous or chromic sulfate, and polymerization catalysts produced from chromium compounds where the chromium may be present in the plus 2 or 3 valence state.

Some of the embodiments described herein include the steps of introducing into a reactor system a solution catalyst including about 1 to about 8 weight percent (wt %) chromium-containing compound dissolved in an inert solvent, based upon total weight, and applying the solution catalyst at least substantially uniformly and in liquid form to the bed wall (and optionally also at least one other interior surface) of the reactor system. In some embodiments, the solution catalyst may contain less than about 6 wt %, or less than about 5 wt % chromium-containing compound in an inert solvent, based upon the total weight. One inert solvent that may be used is toluene.

The amount of chromium compound utilized in the process should be sufficient to effect the desired result, and the amount can be determined without undue experimentation. In any of the embodiments described herein, the amount of chromium compound introduced into the fluidized bed reactor may be greater than about 0.0031 lbs of chromium-containing compound per square foot (0.015 kgs/m$^2$) of surface area to be treated. In other embodiments, greater than about 0.0037 lbs/ft$^2$ (0.018 kgs/m$^2$) of chromium-containing compound may be introduced. In yet other embodiments, greater than about 0.0045 lbs of chromium-containing compound per square foot (0.022 kgs/m$^2$) of surface area to be treated may be introduced into the fluidized bed reactor. In still other embodiments, about 0.0037 to about 0.0045 lbs/ft2 (0.018 to 0.022 kgs/m$^2$) of chromium-containing compound may be introduced. In some embodiments, the interior surface area (of a reactor of the type shown in FIG. 1) to be treated is the cylindrical section of the reactor above the distributor plate, the expanded section, and the top head of the reactor.

A high molecular weight polymer coating formed in accordance with typical embodiments of the invention is a coating of polymer that is more evenly distributed on the relevant interior surfaces of the reactor system (and typically also thicker) than that formed by prior art methods. In some of the embodiments described herein, the high molecular weight polymer coating may be greater than about 10 mils (0.010 inches or 0.25 mm) thick on the bed wall of the fluidized bed reactor, and may be greater than about 10 mils (0.25 mm) thick on substantially all portions of the bed wall. In other embodiments, the high molecular weight polymer coating may be greater than about 20 mils (0.020 inches or 0.51 mm) thick on the bed wall of the fluidized bed reactor, and may be greater than about 20 mils (0.51 mm) thick on substantially all portions of the bed section wall. In a typical fluidized bed reactor with a cylindrical straight section and an expanded section, the bed wall is that portion of the cylindrical straight section of the fluidized bed reactor from the distributor plate to the expanded section. In any of the embodiments described herein, the bed wall may also include portions of the internal wall of the expanded section, particularly in the lower portion of the expanded section. As used herein, "substantially all portions" of a surface refers to largely, but not necessarily wholly, the surface referenced. This means that when "substantially all portions of the bed wall" are referenced, the characteristic (coating thickness, chromium content, or other parameter) will be found largely at most points of the bed wall, but not necessarily at every point on the wall.

The success of forming a polymer coating on the bed wall (and optionally also at least one other interior surface) of a reactor system may also be evaluated by measuring the average thickness of the coating on the bed wall. In some of the embodiments described herein, a high molecular weight polymer coating formed on the bed wall of the fluidized bed reactor has an average thickness of greater than about 10 mils (0.25 mm), or greater than about 20 mils (0.51 mm), or greater than about 25 mils (0.64 mm), or even greater than about 30 mils (0.76 mm).

The success of forming a polymer coating on the bed wall (and optionally also at least one other interior surface) of a reactor system may also be evaluated by measuring how the polymer coating resists the creation of, retains, or dissipates electrical charges. Any method of evaluating the charging, charge retention, and charge dissipation may be used to evaluate the coating. One method is to measure the charge decay performance of the high molecular weight polymer coating. Charge decay performance measures the rate that a coating dissipates a corona charge imposed on the surface of the coating and the level of residual charge present on the surface after a period of time. A corona charge deposition provides a means to simulate practical charging events under controlled and predetermined conditions of initial surface voltage and charge polarity. Corona discharges occur in gaseous media when the localized electric field in the neighborhood of a body exceeds the electrical breakdown voltage of the gaseous medium. They are usually generated as a brief pulse of high voltage to a receiving surface. The charge transfer results in a high initial voltage on the receiving surface. The voltage level decays over time and is referred to as a charge decay curve. The charge decay curve generally exhibits a plateau voltage after an initial and rapid fall of surface voltage. A residual charge is the plateau voltage measured at a given period of time after the corona charge is imposed on the surface. The charge decay of a surface can be measured by any suitable commercially available device, for example, a JCI 155 Charge Decay Meter (JCI, Cheltenham, UK). Because polarity may vary, unless stated otherwise, all voltage readings referenced herein are the absolute values of the voltage.

As used herein, a "residual charge" or "charge decay" is the absolute value of voltage on the surface of a coating after a corona voltage applied to the surface has partially dissipated. It may be desirable to normalize charge decay readings to a standard coating thickness, particularly when dealing with coatings of 10 mils (0.25 mm) or less thickness. In some of the embodiments described herein, the voltage readings may be normalized to a 10 mil (0.25 mm) coating thickness. The voltage reading is typically taken a period of time, for example, 300 seconds, after the corona voltage is applied that is a sufficient time for the voltage to stabilize to a degree (reach a noticeable plateau). The residual charge reading may be taken with any suitable instrument, for example a JCI Charge Decay Meter. The corona discharge voltage may vary depending on the test instrument. In any of the embodiments described herein, the corona voltage applied may be between about −10,000 and about +10,000 volts. In some of the embodiments described herein, the residual charge reading may be taken 300 seconds after the corona voltage is applied. The voltage readings may be normalized to a 10 mils (0.25 mm) thickness using the following equation:

$$\text{Normalized Charge} = \text{Actual Charge} \times (10/T)^n$$

where T=actual thickness of the coating in mils, and n is typically between 0.5 and 1.5.

Some embodiments of the inventive method form a high molecular weight polymer coating on the bed wall of the fluidized bed reactor having a charge decay of greater than about 150 volts, and may be greater than about 400 volts. In other embodiments, the high molecular weight polymer coating may have a charge decay of greater than about 150 volts on substantially all portions of the bed wall, and may be greater than about 400 volts on substantially all portions of the bed wall. In still other embodiments, the high molecular weight polymer coating between 0.3 and 2.4 meters above the distributor plate may have a charge decay of greater than about 1,000 volts, and may be greater than about 1,200 volts.

One class of embodiments provides an improvement in a method for the polymerization of an alpha-olefin in a fluidized bed reactor in the presence of a catalyst (or catalyst system) prone to cause sheeting during the polymerization, by maintaining the static electric charge in the reactor at the site of possible sheet formation below static charge levels which would otherwise cause sheet formation. The improvement is to pretreat the bed wall (and optionally also at least one other interior surface) of the reactor system by forming a polymer coating thereon, including by applying the solution catalyst (typically including a chromium-containing compound) at least substantially uniformly and in liquid form to the bed wall (and optionally also at least one other interior surface). In some embodiments, the solution catalyst includes a chromium-containing compound, and the chromium in the chromium-containing compound is present in a valence state from 2 to 3 when the solution catalyst is applied.

Embodiments described herein may be suitable for use to prepare reactor systems for performing polymerization processes (e.g., gas phase fluid bed polymerization processes) in which a catalyst or catalyst system contacts a monomer or monomer/comonomer. Such processes may include gas phase fluid bed polymerization of one or more olefins at least one of which is ethylene (as described, for example, in U.S. Pat. Nos. 4,543,399, 4,588,790, 5,028,670, 5,317,036, 5,352, 749, 5,405,922, 5,436,304, 5,453,471, 5,462,999, 5,616,661 and 5,668,228), and polymerization processes (e.g., gas phase fluid bed processes) using a cycle fluid that comprises a gas phase and a liquid phase. In some cases, the processes produce polymer product by performing gas phase polymerization on one or more olefin monomers having from 2 to 30 carbon atoms, preferably 2 to 12 carbon atoms, or 2 to 8 carbon atoms (e.g., two or more olefin monomers of ethylene, propylene, butene-1, pentene-1,4-methyl-pentene-1, hexene-1, octene-1 and decene-1). Other monomers useful in the processes may include ethylenically unsaturated monomers, diolefins having 4 to 18 carbon atoms, conjugated or nonconjugated dienes, polyenes, vinyl monomers and cyclic olefins. Non-limiting monomers useful in the invention may include norbornene, norbornadiene, isobutylene, isoprene, vinylbenzocyclobutane, styrenes, alkyl substituted styrene, ethylidene norbornene, dicyclopentadiene and cyclopentene.

In some embodiments, a copolymer of ethylene is produced, where with ethylene, a comonomer having at least one alpha-olefin having from 3 to 15 carbon atoms, from 4 to 12 carbon atoms, or from 4 to 8 carbon atoms, is polymerized in a gas phase process.

The reactor pressure in some embodiments of the inventive gas phase process may vary from about 100 psig (690 kPa) to about 600 psig (4138 kPa), from about 200 psig (1379 kPa) to about 400 psig (2759 kPa), or from about 250 psig (1724 kPa) to about 350 psig (2414 kPa). The reactor temperature during the polymerization may vary from about 30° C. to about 120° C., about 60° C. to about 115° C., about 70° C. to 110° C., or about 70° C. to about 95° C.

Other gas phase processes that can be performed in reactors pretreated in accordance with some embodiments of the invention include series or multistage polymerization processes, and gas phase processes of the type described in U.S. Pat. Nos. 5,627,242, 5,665,818 and 5,677,375, and European publications EP-A-0 794 200 EP-B1-0 649 992, EP-A-0 802 202 and EP-B-634 421.

Other gas phase processes that can be performed in reactors pretreated in accordance with embodiments of the invention are methods for polymerizing propylene alone or with one or more other monomers including ethylene, and/or other olefins having from 4 to 12 carbon atoms. Polypropylene polymers may be produced using the particularly bridged metallocene catalysts as described in U.S. Pat. Nos. 5,296,434 and 5,278,264. Propylene based polymers that may be produced in the process include atactic polypropylene, isotactic polypropylene, syndiotactic polypropylene, and propylene random, block or impact copolymers.

Catalyst systems utilized for polymerizing a polymer product in a reactor system pretreated in accordance with embodiments of the invention include any suitable catalyst system for polymerizing alpha olefins. The catalyst system may be a bimodal catalyst system. The catalyst compounds which may be utilized in the catalyst system include: Group 15 containing metal compounds; metallocene compounds; phenoxide catalyst compounds; and conventional-type transition metal catalysts. All references to chemical compounds used herein refer to the new IUPAC system of describing the science of chemistry in general as defined in *Nomenclature of Organic Chemistry*, Oxford:Pergamon Press, 1979; *A Guide to IUPAC Nomenclature of Organic Compounds, Recommendations* 1993, Oxford:Blackwell Scientific Publications, 1993 and *Nomenclature of Inorganic Chemistry, Recommendations* 1990, Oxford:Blackwell Scientific Publications. (1990). The bimodal or bimetallic catalyst system may comprise any of the catalyst compositions described in, for example, U.S. Pat. Nos. 6,605,675, 6,846,886, 6,956,089, 6,274,684, 6,841,631, 6,894,128, 6,534,604, and 6,689,847 and PCT publications WO01/30861 and WO02/46243. The catalyst systems may further include a catalyst system comprising a supported bisamide catalyst (as described, for example, U.S. Pat. No. 6,271, 325).

Metallocene catalyst compounds and catalyst systems useful for polymerizing a polymer product in reactor systems pretreated in accordance with some embodiments of the invention include those described in, for example, U.S. Pat. Nos. 5,064,802, 5,145,819, 5,149,819, 5,243,001, 5,239,022, 5,276,208, 5,296,434, 5,321,106, 5,329,031, 5,304,614, 5,677,401, 5,723,398, 5,753,578, 5,854,363, 5,856,547 5,858,903, 5,859,158, 5,900,517, 5,939,503 and 5,962,718 and PCT publications WO 93/08221, WO 93/08199, WO 95/07140, WO 98/11144, WO 98/41530, WO 98/41529, WO 98/46650, WO 99/02540 and WO 99/14221 and European publications EP-A-0 578 838, EP-A-0 638 595, EP-B-0 513 380, EP-A1-0 816 372, EP-A2-0 839 834, EP-B1-0 632 819, EP-B1-0 739 361, EP-B1-0 748 821 and EP-B1-0 757 996, and metallocene compounds described in, for example, WO 92/00333, WO 94/07928, WO 91/04257, WO 94/03506, WO96/00244, WO 97/15602 and WO 99/20637, and U.S. Pat. Nos. 5,057,475, 5,096,867, 5,055,438, 5,198,401, 5,227, 440 and 5,264,405 and EP-A-0 420 436.

The metallocene catalyst compounds may include complexes of $Ni^{2+}$ and $Pd^{2+}$ (see, for example, Johnson, et al., "New Pd(II)- and Ni(II)-Based Catalysts for Polymerization of Ethylene and a-Olefins", J. Am. Chem. Soc. 1995, 117, 6414-6415 and Johnson, et al., "*Copolymerization of Ethylene and Propylene with Functionalized Vinyl Monomers by Palladium(II) Catalysts,*" J. Am. Chem. Soc., 1996, 118, 267-268, WO 96/23010, WO 99/02472, U.S. Pat. Nos. 5,852,145, 5,866,663 and 5,880,241). These complexes may be either dialkyl ether adducts, or alkylated reaction products of the described dihalide complexes that can be activated to a cationic state. The metallocene catalysts may be diimine based ligands of Group 8 to 10 metal compounds (as described, for example, in PCT publications WO 96/23010 and WO 97/48735). The metallocene catalysts may include their structural or optical or enantiomeric isomers (meso and racemic isomers and mixtures thereof.

Conventional transition metal catalysts are those traditional Ziegler-Nata catalysts and Phillips-type chromium catalyst. Conventional transition metal catalyst compounds that may be used for polymerizing a polymer product in reactor systems pretreated in accordance with some embodiments of the invention include transition metal compounds from Groups III to VIII, preferably IVB to VIB of the Periodic Table of Elements. Still other conventional transition metal catalyst compounds and catalyst systems that may be suitable for polymerizing a polymer product in reactor systems pretreated in accordance with some embodiments of the invention are disclosed in U.S. Pat. Nos. 4,124,532, 4,302,565, 4,302,566 and 5,763,723 and published EP-A2 0 416 815 A2 and EP-A1 0 420 436. Other catalysts may include cationic catalysts such as $AlCl_3$, vanadium, constrained-geometry catalysts, cobalt, and iron catalysts.

EXAMPLES

It is to be understood that while the invention has been described in conjunction with the specific embodiments thereof, the foregoing description is intended to illustrate and not limit the scope of the invention. Other aspects, advantages and modifications will be apparent to those skilled in the art to which the invention pertains.

Therefore, the following examples are put forth so as to provide those skilled in the art with a complete disclosure and description of how to make and use the compounds of the invention, and are not intended to limit the scope of that which the inventors regard as their invention.

Example 1

Conventional Process

In a conventional chromocene treatment process performed in a commercial polyethylene polymerization reactor system, about 8.2 kg of chromocene is injected into the reactor as an 8 wt. % solution in toluene, while inert gas is cycled through the system. The amount of toluene injected (95 kg) would produce a dew point temperature of 38° C. (with the given reactor volume of 779 m3). Since this is much lower than the gas temperature in the reactor system (80-90° C.) during the chromocene treatment, the droplets rapidly evaporate. A calculated estimate of drying time for the droplets is a few seconds, which is much less than the gas turnover time (40 to 60 seconds). Because of the short drying time, most of the chromocene is circulated through the system as dry powder, and is not capable of wetting the walls of the reactor. Thus, most interior surfaces of the reactor system that are exposed to the recycle gas, including the bed wall and surfaces of the gas recycle subsystem, are not wetted (or not wetted at least substantially uniformly) by the solution catalyst.

Example 2

Embodiment of the Inventive Method including a Toluene Pre-Charging Step

This embodiment is a variation on Example 1 in which the dew point temperature (of the contents of the reactor system) is raised by pre-charging 300 kg of toluene into the reactor system before introducing the chromocene solution. The 300 kg of additional toluene, combined with the 95 kg added with the chromocene, produces a dew point temperature of 72° C. This is much closer to the reactor bulk gas temperature (in the range from 80-90° C.) and would therefore provide much slower drying of the chromocene solution droplets. The drying of the chromocene solution droplets occurs sufficiently slowly that adequate wetting of the bed wall (and other surfaces of the gas recycle subsystem) by liquid chromocene solution droplets occurs.

Example 3

Embodiment of the Inventive Method including Introduction of a More Dilute Chromocene/Toluene Solution This embodiment is another variation on Example 1 in which a more dilute solution of chromocene in toluene is introduced into the reactor system. In this example, the same 8.2 kg of chromocene is added but the chromocene is pre-mixed with 395 kg of toluene to produce a 2 wt. % solution (rather than an 8 wt. % solution as in Example 1). Since this is the same amount of toluene as added in Example 2, it would produce the same dew point temperature (72° C.) as in Example 2. Thus, the chromosome solution droplets dry sufficiently slowly that adequate wetting of the bed wall (and other surfaces of the gas recycle subsystem) by liquid chromocene solution droplets occurs.

Performing the method of either of Examples 2 and 3 increases the dew point temperature in the reactor (due to the presence of additional toluene). With the dew point temperature increased from 38 to 72° C., the temperature differential (reactor temperature minus dew point temperature) is reduced from 47 to 13° C. At 72° C., the dew point temperature is sufficiently low to prevent an unacceptable amount of liquid condensation on the coolest surface in the system (which is typically the compressor inlet, where the temperature is typically about 75-78° C.). This produces the desired result of a reduced temperature differential for delayed drying of the solution catalyst droplets, allowing liquid wetting of interior reactor surfaces with solution catalyst while minimizing the possibility of having excessive amounts of toluene condensing on the surfaces from the vapor phase.

Example 4

Embodiment of the Inventive Method with Lowered Reactor Gas Temperature

In both Examples 2 and 3 above, the drying rate of the solution catalyst droplets is reduced by increasing the dew point temperature. This reduces the temperature differential between the reactor gas and the dew point temperature, thereby reducing the drying rate of the droplets. A similar result can be obtained by introducing the solution catalyst under the condition of sufficiently reduced reactor gas temperature. In this case, the dew point temperature is not raised (by adding more toluene). Instead, the reactor gas temperature is reduced in comparison to Example 1, and the chromocene solution droplets also dry sufficiently slowly that adequate wetting of the bed wall (and other surfaces of the gas recycle subsystem) by liquid solution catalyst droplets occurs.

In Example 4, the same solution catalyst injection methodology can be used as in the conventional process (injection of 8.2 kg of chromocene in 95 kg of toluene) to produce the same dew point temperature (38° C.) as in Example 1. In Example 4, the desired low temperature differential is obtained by operating the reactor system at a gas temperature in the range 45-50° C. Operation with reactor temperature in this range produces a relatively low temperature differential of 7-12° C.

In this case, it is also important to ensure that the lowest temperature in the reactor system (typically at the compressor inlet) will not cause condensation of excessive amounts of toluene. With a reactor gas temperature in the range 45-50° C., the compressor inlet temperature will be in the range of about 40-45° C. Since this is higher than the dew point temperature (38° C. in this case), no condensation should occur.

Example 5

Higher Dew Point Temperature Combined with Lower Reactor Gas Temperatures

Some embodiments employ both lowered reactor gas temperature (e.g., as in Example 4) and increased solvent amount (e.g., as in Example 2 or 3) to produce the desired sufficiently low temperature differential without condensation on the coolest section(s) of the reactor walls.

In a class of embodiments, the invention is a method for treating at least one interior surface (e.g., a bed wall) of a fluidized bed polymerization reactor system, including the steps of: (a) applying a solution catalyst to each said surface, where the catalyst component of the solution catalyst is or includes at least one chromium containing compound ("CCC"); and (b) after step (a), introducing oxygen into the reactor system to cause controlled oxidation of at least some of the CCC that has been applied. In some embodiments, the CCC is chromocene. In some embodiments, excess solvent is removed from the reactor system after step (a) and before step (b). In preferred embodiments, the concentration of oxygen in the system during the oxidation step is limited so as not to exceed 200 parts per million by volume (ppm), and more preferably so as not to exceed 100 ppm. In some embodiments, the oxidation step has a controlled duration. Preferably, the oxidation step is completed in less than about two hours (or in less than about one hour in some preferred embodiments). The oxidation step is considered complete after the intended amount of oxygen is fed to the reactor and the intended duration of exposure to the oxygen has expired. Use of the term "completed" in this context is not intended to denote that the oxidation is chemically complete, or that all of the chromium (CCC) that is present is oxidized.

Typically, after oxidation of the applied catalyst, a polymerization reaction (catalyzed by the catalyst) is performed to form a polymer coating on each surface. Preferably each so-formed coating reliably functions as an insulating layer that reduces static charging in the reactor system (and thereby reduces the potential for sheeting) during subsequent polymerization reactions in the reactor system. Preferably, the solution catalyst is applied at least substantially uniformly and in liquid form (e.g., in the form of liquid droplets of the solution catalyst) to each surface. Typically, the applied solution catalyst is dried (or allowed to dry) to leave a dry coating of catalyst on each surface before the oxidation step.

In some preferred embodiments, the polymerization reaction begins as soon as possible after application the solution catalyst and oxidation of the applied catalyst (unless the applied, oxidized catalyst is maintained in an inert atmosphere after oxidation and before the start of polymerization). The polymerization reaction (catalyzed by the catalyst) is performed to form a polymer coating on each surface to which the catalyst has been applied. In some embodiments, the polymerization reaction is begun within two hours after completion of the oxidation step (unless the applied, oxidized catalyst is maintained in an inert atmosphere after oxidation and before the start of polymerization). In other embodiments, the polymerization reaction is begun within 48 hours after completion of the oxidation step (unless the applied, oxidized catalyst is maintained in an inert atmosphere after oxidation and before the start of polymerization). In other embodiments, it may be necessary to delay commencement of the polymerization reaction after application the solution catalyst and oxidation of the applied catalyst (e.g., to transport and/or store the reactor prior to placing it in service).

Preferably, the concentration of oxygen in the system during the oxidation step is limited (e.g., so as not to exceed 100 ppm) so as to limit oxidation of the deposited CCC catalyst. This is because the inventors have recognized that excess oxidation of the deposited CCC catalyst typically results in insufficient (too low) chromium activity during subsequent formation of the polymer coating. In some cases in which excess CCC is cleaned from various parts of the reaction system after application of the solution catalyst and oxidation of the applied catalyst but before forming the polymer coating, the treated surfaces of the reaction system are opened to the air (to perform the cleaning) before the applied catalyst is reacted with a monomer to form the polymer coating. Without being bound by theory, it is believed that further oxidation of the deposited chromium occurs when the reaction system is so opened to air (after the inventive controlled oxidation step), and that such further oxidation can be excessive in the sense that it results in insufficient chromium activity when forming the polymer coating unless the concentration of oxygen in the system during the oxidation step is limited (e.g., so as not to exceed 100 ppm) in accordance with the invention.

In some preferred embodiments, the inventive controlled oxidation step is limited in duration (e.g., added oxygen is circulated in the system for less than 2 hours). Experiments performed by the inventors have indicated that increased duration of the oxidation step typically reduces the activity of the applied (and then oxidized) CCC catalyst during subsequent formation of a polymer coating, and that excessive duration of the oxidation step can result in insufficient activity of the oxidized CCC catalyst during the subsequent polymerization operation. Table 2 sets forth data resulting from such experiments:

TABLE 2

| Sample | Catalyst deposition Temp. | Oxidation duration (hrs) | Polymer formed (grams) |
|---|---|---|---|
| 1 | RT | 72 | 0.0034 |
| 2 | 70 deg (C.) | 72 | 0.0054 |
| 3 | RT | 48 | 0.0074 |
| 4 | 70 deg (C.) | 48 | 0.0140 |
| 5 | RT | 24 | 0.0145 |
| 6 | 70 deg (C.) | 24 | 0.0393 |
| 7 | RT | 0.5 | 0.0310 |
| 8 | RT | 0.5 | 0.0326 |

Each row of Table 2 sets forth the amount (in grams) of polymer formed on a metal coupon by a polymerization reaction catalyzed by chromocene catalyst that had previously been applied to the coupon (at the indicated temperature, where "RT" denotes room temperature), where the applied catalyst was oxidized for the indicated duration before the polymerization reaction.

We next describe treatment of a gas phase fluidized bed reactor (having a conical expanded section) in accordance with an embodiment of the invention. The straight section of the reactor had an inner diameter of about 4.9 meters. The reactor contained approximately 471 square meters of surface area to be treated (the reactor wall above the distributor plate, the expanded section, and the top head). Before performing the inventive treatment, the reactor system was first cleaned by removing excess polymer and an injection system of the type shown in FIG. 5 containing ten injection devices 300 (110° V-jet Nozzles model H1/4VV11006 supplied by Spraying Systems Company) was installed in the reaction system. The geometry and other parameters of the solution catalyst injection system and the reactor system during the solution catalyst injection (including acceptable variations on the preferred parameters) are summarized in Table 3:

TABLE 3

Chromocene Solution Injection System

| | | | Target | Max | Min |
|---|---|---|---|---|---|
| Cr Solution Nozzles | Number | | 10 | — | 8 |
| | Type | | V-jet 110006 | — | — |
| | Injection Pressure | (bar-g) | 2.75 | 3.1 | 2.4 |
| | Separation Between Nozzles | (degrees) | 36 | 34 | 38 |
| | Location from Wall | (cm) | 15 | 20 | 10 |
| | Location From Dist Plate | (m) | 0.5 | 0.6 | 0.4 |
| | Horizontal Orientation | (Angle inward from Tangent) | 47 | 50 | 45 |
| | Vertical Orientation | (Angle upward from Horizontal) | 45 | 50 | 40 |
| Reactor Conditions During Injection | Temp | (C.) | 80 | 85 | 75 |
| | CGV | (m/s) | 0.4 | 0.6 | 0.35 |

The next step in the treatment was to pressure up and purge the reactor system by circulating nitrogen through it until moisture within the system was below 10 ppmv (parts per million by volume) and oxygen concentration was below 1 ppmv. A 5 wt % solution of chromocene in toluene was then injected under conditions within the ranges shown in Table 3. During the injection, chromocene was fed to ten spray nozzles substantially concurrently. A total of 180 kgs. of chromocene solution (9 kgs. of active chromocene) was injected in about 15 minutes. The chromocene solution was circulated for about one hour after injection was complete. The reaction system was then oxidized for one hour at 100 ppmv with oxygen supplied from breathing air cylinders. Next the reaction system was purged to less than 1.0 ppmv oxygen and less than about 1.0 ppmv toluene. The reactor pressure and temperature were adjusted to about 5.0 BARG and 85° C. Ethylene was then fed to establish a partial pressure of about 4.0 BARA. Next, 15 kgs of TEAl was fed over a period of about 190 minutes. The ethylene and TEAl circulated for about 60 hours, while incoming flows and venting from the reaction system were minimized. Next, $CO_2$ was fed to establish a concentration of about 0.5 mol % and circulated for about 60 minutes. Then, the reaction system was hydrolyzed at 850 ppmv of water. Next, the reaction system was opened for inspection, and the compressor was cleaned, cycle cooler changed, and distributor plate was sandblasted. The walls of the reactor, and expanded section were smoothed ("polished") by hand scraping.

The polymer coating was inspected and found to be thick and uniform. Measurements of the thickness of the high molecular weight polymer coating were taken at various points in the reactor. The reactor walls were found to have a high molecular weight polymer coating with an average thickness of about 24 mils (0.61 mm) and a minimum thickness of greater than about 20 mils (0.51 mm).

The phrases, unless otherwise specified, "consists essentially of" and "consisting essentially of" do not exclude the presence of other steps, elements, or materials, whether or not, specifically mentioned in this specification, as along as such steps, elements, or materials, do not affect the basic and novel characteristics of the invention, additionally, they do not exclude impurities normally associated with the elements and materials used.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

All priority documents are herein fully incorporated by reference for all jurisdictions in which such incorporation is permitted and to the extent such disclosure is consistent with the description of the present invention. Further, all documents and references cited herein, including testing procedures, publications, patents, journal articles, etc. are herein fully incorporated by reference for all jurisdictions in which such incorporation is permitted and to the extent such disclosure is consistent with the description of the present invention.

While the invention has been described with respect to a number of embodiments and examples, those skilled in the art, having benefit of this disclosure, will appreciate that other embodiments can be devised which do not depart from the scope and spirit of the invention as disclosed herein.

What is claimed is:

1. A method of producing a polymer product in a fluidized bed polymerization reactor system, including the steps of:
    (a) treating at least one interior surface of the reactor system using a solution catalyst comprising at least one catalyst dissolved in at least one solvent, including by applying the solution catalyst at least substantially uniformly and in liquid form to each said surface, wherein contents of the reactor during step (a) have a dew point temperature, and said contents include the solution catalyst, while maintaining conditions in the reactor system, including reactor temperature, sufficient to maintain the dew point temperature at the reactor temperature during uniform wetting of each said interior surface by the solution catalyst; and
    (b) performing a first polymerization reaction, catalyzed by the catalyst, to form on each said surface a polymer coating; and
    (c) after step (b) performing a second polymerization reaction in the reactor system to produce the polymer product, wherein the second polymerization reaction is catalyzed by one of a second catalyst and a second catalyst system, and the polymer coating formed in step (b)

produces an insulating layer to reduce static charging in the reactor system during performance of the second polymerization reaction.

2. The method of claim 1, wherein liquid droplets of the solution catalyst are applied directly to each said surface during step (a) before said droplets evaporate or undergo sublimation.

3. The method of claim 1, wherein the reactor system has a bed wall and step (a) includes the step of applying the solution catalyst at least substantially uniformly and in liquid form to the bed wall.

4. The method of claim 1, wherein the reactor system has a bed wall, a distributor plate, and a gas recycle line, and step (a) includes the step of applying the solution catalyst at least substantially uniformly and in liquid form to the bed wall, the distributor plate, and the recycle line.

5. The method of claim 1, wherein the solution catalyst comprises a dissolved chromium containing compound.

6. The method of claim 5, wherein the chromium containing compound is chromocene.

7. The method of claim 1, wherein the solution catalyst comprises chromocene dissolved in toluene.

8. The method of claim 1, wherein the polymer coating formed in step (b) comprises a high molecular weight polymer, and the polymer product produced in step (c) is a low molecular weight polymer.

9. The method of claim 1, wherein the polymer product produced in step (c) is a polyolefin, and the second polymerization reaction polymerizes a monomer in the presence of said one of the second catalyst and the second catalyst system.

10. The method of claim 1, wherein the polymer product produced in step (c) is polyethylene.

11. The method of claim 1, wherein the second polymerization reaction is catalyzed by a second catalyst selected from a group consisting of Ziegler-Natta, chromium, chromium oxide, AlCl3, cobalt, iron, palladium, constrained-geometry catalyst, and metallocene catalysts.

12. The method of claim 1, wherein the polymer product produced in step (c) is a polyolefin, and the second polymerization reaction polymerizes a monomer and a comonomer in the presence of said one of the second catalyst and the second catalyst system.

13. The method of claim 12, wherein the second catalyst is a metallocene based catalyst and the second catalyst system is a metallocene based catalyst system.

14. The method of claim 1, wherein step (a) includes the step of:
introducing the solution catalyst into the reactor system under conditions such that the solution catalyst has a drying rate sufficiently low so as not to prevent at least substantially uniform wetting of each said interior surface by the solution catalyst.

15. The method of claim 1, wherein the reactor system includes a gas recycle subsystem and a reactor, the gas recycle subsystem includes a gas recycle line having an inlet and an outlet coupled to the reactor, the solution catalyst is a chromium containing compound dissolved in toluene, and step (a) includes the step of:
introducing droplets of the solution catalyst into the reactor system while inert gas flows cyclically through the gas recycle subsystem with a gas turnover time, under conditions such that the droplets dry with a half-life of not less than twice the gas turnover time, where said gas turnover time is total volume of the reactor system divided by volumetric flow rate of the gas through the gas recycle subsystem.

16. The method of claim 1, wherein the reactor system has a bed wall and step (a) includes the step of:
maintaining a sufficiently low temperature in the reactor system so that at least a substantial quantity of the solution catalyst neither vaporizes nor sublimates before wetting the bed wall.

17. The method of claim 1, wherein step (a) includes the step of:
feeding additional solvent into the reactor system to maintain the dew point temperature at the reactor temperature during at least substantially uniform wetting of each said interior surface by the solution catalyst.

18. The method of claim 1, wherein step (a) includes the step of:
diluting the solution catalyst with additional solvent to produce diluted solution catalyst, and introducing the diluted solution catalyst into the reactor system to maintain the dew point temperature at the reactor temperature during at least substantially uniform wetting of each said interior surface by the solution catalyst.

19. The method of any claim 1, wherein the reactor system has a bed wall, contents of the reactor during step (a) have a dew point temperature, and said contents include the solution catalyst, and wherein step (a) includes the step of:
maintaining conditions in the reactor system, including reactor temperature, sufficient to maintain the dew point temperature sufficiently close to the reactor temperature to prevent at least a substantial quantity of the solution catalyst from vaporizing or sublimating before wetting the bed wall.

20. The method of claim 19, wherein step (a) includes the step of:
feeding additional solvent into the reactor system to maintain the dew point temperature sufficiently close to the reactor temperature to prevent at least a substantial quantity of the solution catalyst from vaporizing or sublimating before wetting the bed wall.

21. The method of claim 20, wherein step (a) includes the step of:
precharging the reactor system with the additional solvent before introducing the solution catalyst into the reactor system.

22. The method of claim 19, wherein step (a) includes the step of:
diluting the solution catalyst with additional solvent to produce diluted solution catalyst, and introducing the diluted solution catalyst into the reactor system to maintain the dew point temperature sufficiently close to the reactor temperature to prevent at least a substantial quantity of the solution catalyst from vaporizing or sublimating before wetting the bed wall.

23. The method of claim 19, wherein step (a) includes the step of:
maintaining conditions in the reactor system sufficient to maintain the dew point temperature within a range from 5° C. to 30° C. of the temperature at a coolest point in the reactor system.

24. The method of claim 1, wherein each said interior surface of the reactor system is a nonsensitive surface and the reactor system also includes at least one sensitive surface, and said method also includes the step of:
(d) before step (a), applying a zinc coating to at least one said sensitive surface but not to at least one said nonsensitive surface, and wherein step (a) includes the steps of:
applying the solution catalyst at least substantially uniformly and in liquid form to each said nonsensitive surface, and performing the first polymerization reaction, catalyzed by the catalyst, to form the polymer coating on each said nonsensitive surface.

25. The method of claim 24, wherein steps (a) and (d) are performed so as to prevent fouling of any element of the system with excess polymer material.

26. The method of claim 24, wherein steps (a) and (d) are performed so as to form less polymer on each sensitive surface than on each nonsensitive surface during step (a).

27. The method of claim 24, wherein the reactor system includes a distributor plate surface, a cooler surface, a compressor surface, a recycle line surface, and a reactor bed wall, the at least one sensitive surface includes at least one of the distributor plate surface, the cooler surface, the compressor surface, and the recycle line surface, and at least one said interior surface is at least a portion of the reactor bed wall.

28. The method of claim 1, wherein the at least one interior surface of the reactor system includes at least one nonsensitive surface and at least one sensitive surface, and step (a) includes the steps of:
  applying a zinc coating to at least one said sensitive surface but not to at least one said nonsensitive surface;
  applying the solution catalyst at least substantially uniformly and in liquid form to each said nonsensitive surface and to each said sensitive surface; and step (b) is replaced by the step of:
  performing the first polymerization reaction, catalyzed by the catalyst, to form the polymer coating on each nonsensitive surface and each said sensitive surface.

29. The method of claim 28, wherein steps (a)-(b) are performed so as to prevent fouling of any element of the system with excess polymer material.

30. The method of claim 28, wherein steps (a)-(b) are performed so as to form less polymer on each sensitive surface than on each nonsensitive surface.

31. The method of claim 28, wherein steps (a)-(b) are performed so that the polymer coating formed on each said sensitive surface has smaller average thickness than the polymer coating formed on each said nonsensitive surface.

32. The method of claim 28, wherein the reactor system includes a distributor plate surface, a cooler surface, a compressor surface, a recycle line surface, and a reactor bed wall, the at least one sensitive surface includes at least one of the distributor plate surface, the cooler surface, the compressor surface, and the recycle line surface, and the at least one nonsensitive surface is or includes at least a portion of the reactor bed wall.

* * * * *